(12) United States Patent
Kim et al.

(10) Patent No.: US 6,809,845 B1
(45) Date of Patent: Oct. 26, 2004

(54) PHASE IMAGING USING MULTI-WAVELENGTH DIGITAL HOLOGRAPHY

(75) Inventors: Myung K. Kim, Tampa, FL (US); James Gass, Tampa, FL (US); Aaron Dakoff, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 10/668,080

(22) Filed: Sep. 22, 2003

Related U.S. Application Data

(60) Provisional application No. 60/319,574, filed on Sep. 25, 2002.

(51) Int. Cl.[7] .................................................. G03H 1/08
(52) U.S. Cl. ............................ 359/9; 359/32; 359/35; 356/457
(58) Field of Search ........................... 359/9–11, 29–32, 359/35; 356/457, 458, 484–490; 378/36; 73/656

(56) References Cited

U.S. PATENT DOCUMENTS 6,262,818 B1 * 7/2001 Cuche et al. ................. 359/9

OTHER PUBLICATIONS

M.Servin et al., "Phase unwrapping with a regularized phase–tracking system", Applied Optics 37(10), pp. 1917–1923(1998).*

E.Cuche et al., "Digital holography for quantitative phase-–contrast imaging", Optics Letters 24(5), pp. 291–293(1999).*

B.Gutmann and H.Weber, "Phase unwrapping with the branch–cut method: role of phase–field direction", Applied Optics 39(26), pp. 4802–4816(2000).*

Gass et al.; Phase Imaging without 2 Ambiguity by Multi-wavelength Digital Holography; Optics Letter; vol. 28, No. 13; Jul. 1, 2003.

* cited by examiner

*Primary Examiner*—Leo Boutsikaris
(74) *Attorney, Agent, or Firm*—Smith & Hopen, P.A.; Anton J. Hopen; Molly L. Sauter

(57) ABSTRACT

The present invention is a phase-imaging technique by digital holography that eliminates the problem of $2\pi$-ambiguity. The technique is based on a combination of two or more digital holograms generated using multiple wavelengths. For a two-wavelength experiment, the phase maps of two digital holograms of different wavelengths are subtracted which yields another phase map whose effective wavelength is inversely proportional to the difference of wavelengths. Using two holograms made with a 633 nm HeNe laser and a 532 nm doubled YAG laser an image was obtained that is a 3D reconstruction of a reflective surface with axial resolution of ~10 nm over a range of ~5 um, without any phase discontinuity over this range. The method can be extended to three wavelengths or more in order to reduce the effect of phase noise further.

17 Claims, 25 Drawing Sheets

FIG. 5

$$H = |O+R|^2 \qquad (2.1)$$

$$H = |O|^2 + O^*R + OR^* + |R|^2 \qquad (2.2)$$

$$E(x,y;z) = \frac{-ik}{2\pi} \iint_\Sigma dx_0 dy_0 E_0(x_0,y_0) \frac{e^{ikr}}{r} \qquad (2.3)$$

$$\phi = m \cdot x \qquad (2.4)$$

$$m = \frac{2\pi(\lambda_1 - \lambda_2)}{\lambda_1 \lambda_2} \qquad (2.5)$$

$$\lambda_2 \geq \frac{\Delta\varphi}{m} = \frac{\Delta\varphi \lambda_1 \lambda_2}{2\pi(\lambda_1 - \lambda_2)} \qquad (2.6)$$

$$\Delta\varphi_b = \frac{2\pi(\lambda_1 - \lambda_2)}{\lambda_2} \qquad (2.7)$$

$$\Delta\varphi_s = \frac{\Delta\varphi_b}{2} = \frac{\pi(\lambda_1 - \lambda_2)}{\lambda_2} \qquad (2.8)$$

$$x_r = \frac{\lambda_1 \lambda_2}{\lambda_1 - \lambda_2} \qquad (2.9)$$

$$x_r = \frac{\pi \lambda_1}{\Delta\varphi_s} \qquad (2.10)$$

$$\Delta x = \frac{\Delta\varphi_s \lambda_2}{2\pi} \qquad (2.11)$$

$$\lambda_1 = \frac{x_r \lambda_2}{x_r - \lambda_2} \qquad (2.12)$$

FIG. 12
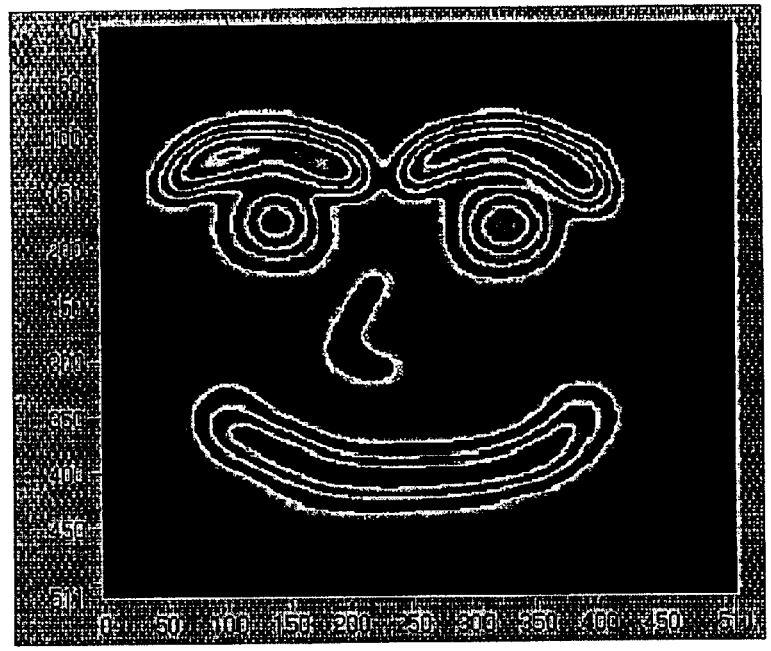
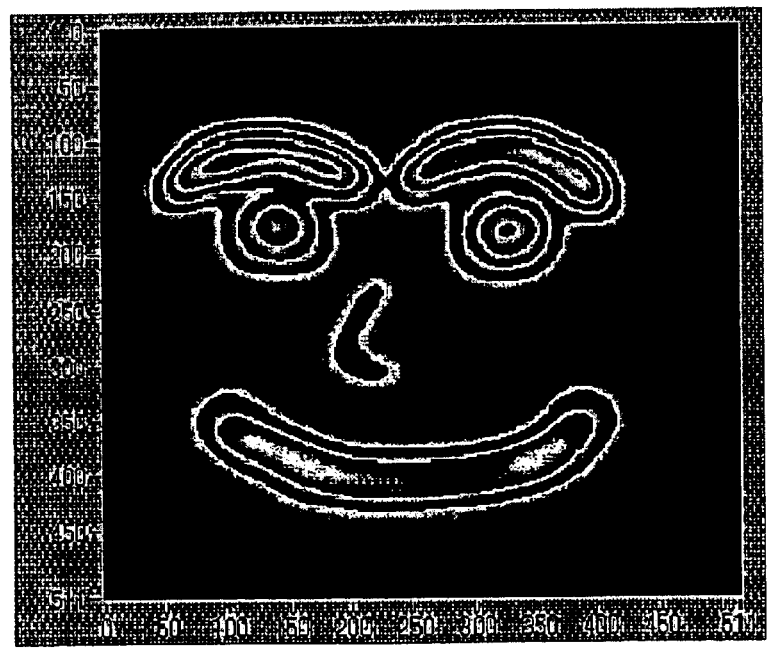

FIG. 15
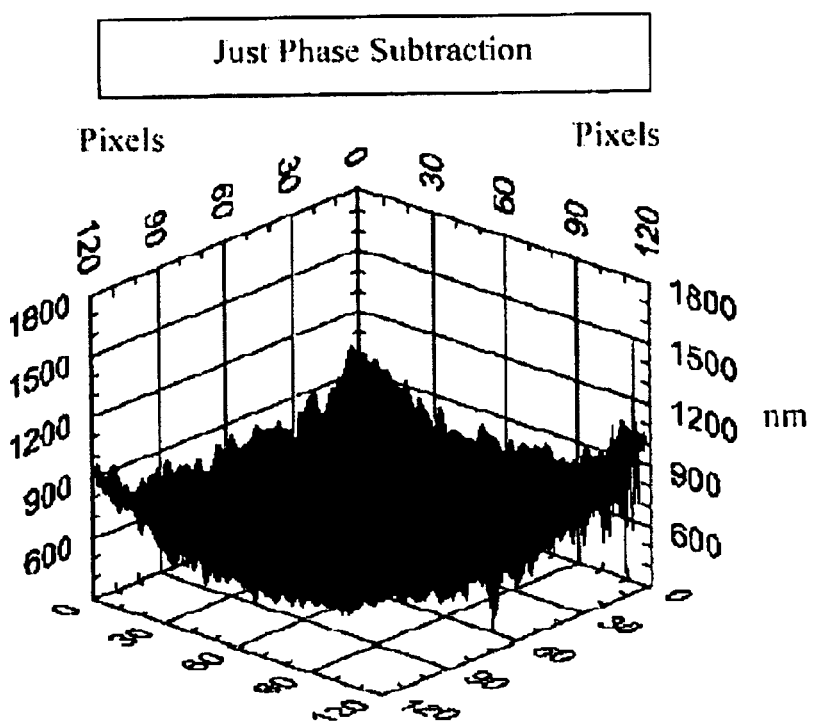
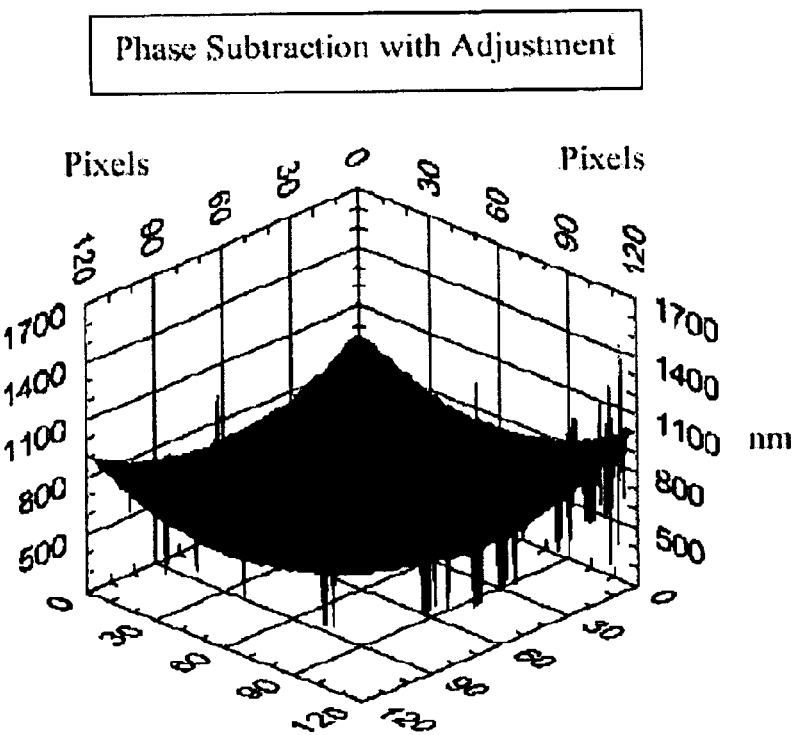

FIG. 17
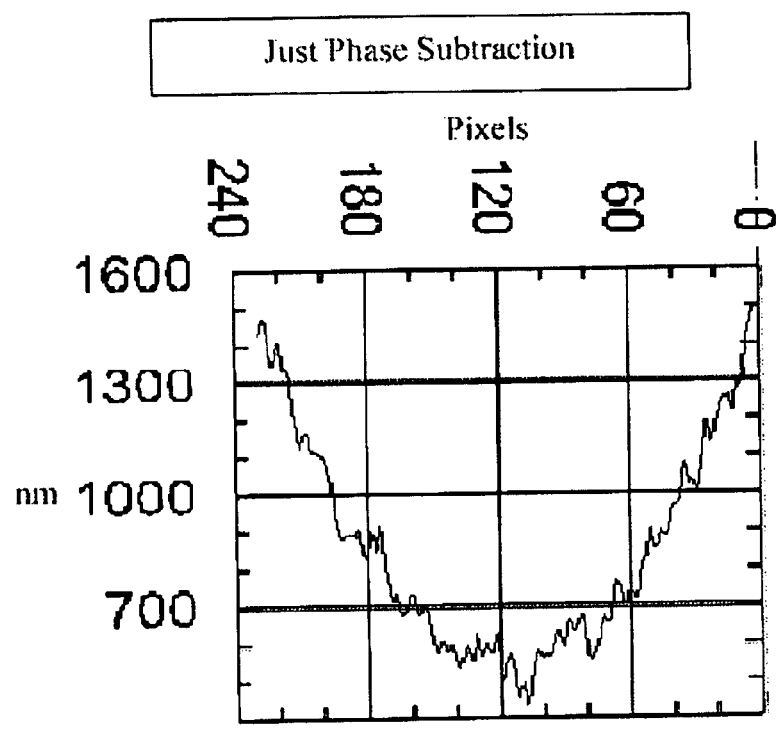
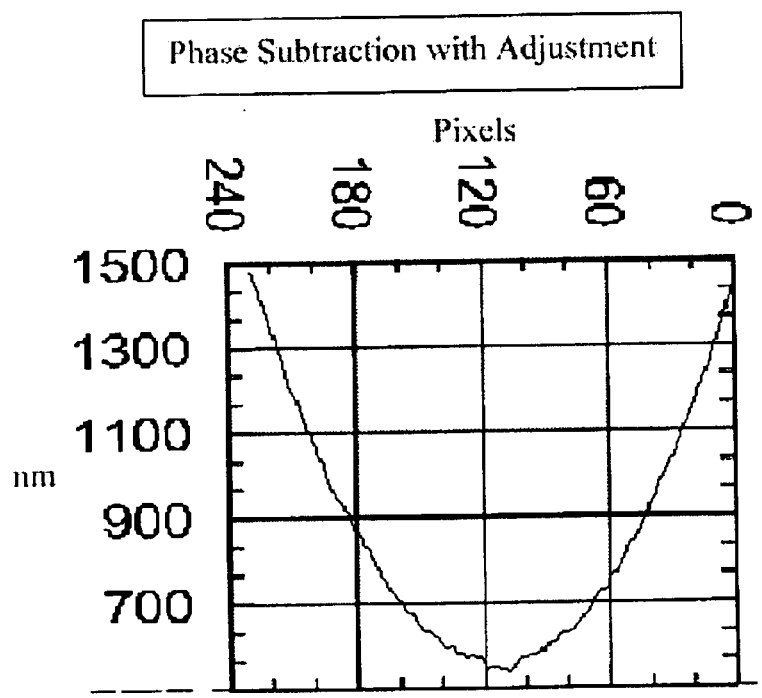

FIG. 21

$$R - R\cos\theta = H \quad (7.1)$$

$$\cos\theta = 1 - \frac{\theta^2}{2} \quad (7.2)$$

$$\theta = \sin\theta = \frac{y}{R} \quad (7.3)$$

$$R - R(1 - \frac{y^2}{2R^2}) = H \quad (7.4)$$

$$R = \frac{y^2}{2H} \quad (7.5)$$

PHASE IMAGING USING MULTI-WAVELENGTH DIGITAL HOLOGRAPHY

CROSSS REFERENCE TO RELATED APPLICATION

This application claims priority to Provisional Patent Application No. 60/319,574 filed, Sep. 25, 2002.

BACKGROUND OF INVENTION

Holography is used in a variety of applications ranging from printed holograms used on credit cards to metrology devices used in integrated circuit manufacturing. Traditional holography methods involve the recording on film of phase shifts of the object of interest. These phase shifts are recorded using two beams of coherent light, an object beam, which impinges upon the object of interest, and a reference beam. The interference of the object beam and the reference beam generates phase patterns, which correlate to physical feature of the object of interest. Once the image is recorded, an image of the original object can be regenerated by passing light through the recording film providing a three dimensional holographic image. A traditional photograph records the intensity of light reaching a piece of film. A lens is used to record the image of an object so that each point on the object is focused to a point on the film. The film records the intensities at each point and we recognize this as the original object. A hologram is different because it is capable of recording phase. Since light is a wave, it has the ability to interfere with itself. Through this interference we can find the phase of the light. A hologram is made by taking a very coherent light source and splitting it into two beams. One beam goes straight to the film. This beam provides a reference of what the laser light looks like and is called the reference beam. The other beam illuminates the object and is called the object beam. When this light hits the object, it is reflected off toward the film. At the film, interference occurs between the electric fields of the reference beam and the object beam. If the angle between the reference beam and the object beam is near zero it is called an "on-axis hologram". If the angle is greater than zero it is called an "off-axis hologram". In both situations the intensity of the interference is recorded by the film. This is described by Equations 2.1 and 2.2.

H is the intensity field recorded onto the film, O is the object beam's electric field, and R is the electric field due to the reference beam. Unlike a traditional photograph, in holography, what gets recorded onto the film does not look like the object. The $|O|^2$ term is the intensity pattern of the light that came from the object and $|R|^2$ is the intensity of the reference beam. O*R and OR* are the interference terms and is what we are interested in. To view the hologram the reference beam must be shined onto the film. The virtual image appears at the same location as the original object. The virtual image has depth and can be viewed from different angles just as the original could. A real image is also formed and can be projected onto a white card.

The advent of the charged coupled device (CCD) and digital cameras allows the application of digital technology to the field of holography, eliminating the need for film recordings. Digital holograms offer some advantages over prior art film recordings. Reconstruction of the image is carried out using software thereby permitting more control over the reconstructed image and time and cost of the hologram are reduced. However, the prior art digital holograms suffer from what is referred to as the $2\pi$ ambiguity problem. Since the recording only records a phase shift in a wave, features of the target object greater than one wavelength are not recorded properly. The phase imaging by digital holography allows sub-wavelength resolution in microscopic imaging. However for axial ranges greater than one wavelength the phase image has $2\pi$ ambiguity and is therefore unable to distinguish points that are separated by an axial distance that is a multiple of the wavelength. Depending upon the application involved, a wavelength is selected which is sufficiently long to cover the range required to avoid $2\pi$ ambiguity. However, the longer the wavelength, the lower the resolution.

Phase unwrapping is known in the art as a method to resolve $2\pi$-ambiguity. The simplest form of phase unwrapping is to move along the phase map until you get to a sudden $2\pi$ discontinuity. The program can identify this sudden jump and add $\lambda$ to the height of the map to compensate for the expected discontinuity. At the next discontinuity, the program adds $2\lambda$ to the height map, and so on.

Another phase unwrapping method known in the art is the minimum spanning tree method. The minimum spanning tree method is an attempt to prevent spike noise and local inconsistencies from reducing the accuracy of the overall unwrapped image. The first step of this method is to go from one pixel to its nearest neighbor with the smallest change in phase. When each pixel is being considered, neighboring pixels are looked at and used to try to suppress noise spikes. In the next step, tiles of pixels are made. The tiles are designed to slightly overlap. The edges are used to compare each tile to its neighbor. Areas where there are inconsistencies are avoided so that their errors do not continue for the rest of the map.

All forms of phase unwrapping algorithms make the assumption that the surface does not have discontinuities more than $2\pi$. If the surface violates this then the map will not be accurate. This is a problem for maps that are not well behaved or that have speckle that must first be removed.

It is known in the art that contours can be generated by using two different wavelengths to produce a hologram. This procedure is similar to that of a regular hologram. The difference being that, after the film is exposed to the object beam and reference beam, it is exposed again with an object beam and a reference beam of a slightly different wavelength. The closer together the frequency the further apart the contours are spaced.

It is known in the art to use digital holography to assign accurate, consistent intensity values to an image and to make it possible to calculate and extrapolate phase information. The field of digital holography is relatively new because, until recently, the needed devices such as a CCD (charge-coupled device) and computers have not been capable of this task.

There remains a need for a system and method to provide a high-resolution hologram for objects with surface discontinuities greater than $2\pi$ that eliminates $2\pi$ ambiguity.

However, in view of the prior art considered as a whole at the time the present invention was made, it was not obvious to those of ordinary skill in the pertinent art how the identified need could be fulfilled.

SUMMARY OF INVENTION

The method in accordance with the present invention resolves the $2\pi$-ambiguity associated with an axial range greater than one wavelength by a method that employs digital holograms generated with two or more wavelengths.

The method in accordance with the present invention is a combination of digital holographic phase mapping and contour generation. The contour generation is used to determine what fringe number a pixel is on, and the phase map is then used to produce sub-wavelength resolution. This makes it possible to get detailed sub-wavelength resolution over several wavelengths of range without the using phase unwrapping algorithms.

Additionally, since the two-wavelength method of the present invention still has ambiguities, they are just separated by a much larger distance; conventional phase unwrapping methods are still applicable. If the assumption that the surface does not have discontinuities greater than $\lambda$ is reasonable, then the assumption that the surface does not have discontinuities greater then $10\lambda$ is reasonable.

In accordance with the present invention, a digital holographic phase-imaging method to resolve ambiguities includes generating a digital holographic phase map of an object at a first wavelength, generating a digital holographic phase map of the object at a second wavelength, subtracting the second phase map from the first phase map, resolving the fringe number for each pixel phase value, and referencing the digital holographic phase map at the first wavelength thereby reproducing the image of the object. It is also within the scope of the present invention to employ the method of the present invention utilizing more than two wavelengths.

In an embodiment of the present invention, the step of generating a digital holographic phase map of an object at a first wavelength, includes recording a first digital hologram image of the object at the first wavelength utilizing an object beam and a reference beam, recording a first digital object image of the object at the first wavelength utilizing an object beam, recording a first digital reference image of the object at the first wavelength utilizing a reference beam, and subtracting an intensity pattern of the first digital object image and an intensity pattern of the first digital reference image from the first digital hologram image resulting in a digital holographic phase map of the object at the first wavelength. And, recording a second digital hologram image of the object at the second wavelength utilizing an object beam and a reference beam, recording a second digital object image of the object at the second wavelength utilizing an object beam, recording a second digital reference image of the object at the second wavelength utilizing a reference beam, subtracting an intensity pattern of the second digital object image and an intensity pattern of the second digital reference image from the second digital hologram image resulting in the digital holographic phase map of the object at the second wavelength.

In a specific embodiment, the angle between the reference beam and the object beam at the first and second wavelengths is greater than zero, thereby producing an off-axis hologram. Additionally, the first wavelength and the second wavelength can be within the visible range or the infrared range, while additional wavelengths are within the scope of the invention.

The referencing the digital holographic phase map at the first wavelength, thereby reproducing the image of the object as presented by the present invention, includes simulating a reference wave at a first wavelength incident upon the digital holographic phase map.

Additionally, resolving the fringe number for each pixel phase value includes converting the result of the subtracting step into a plurality of distance values, dividing each distance value by the second wavelength, truncating the result of the dividing step, multiplying the result of the truncating step by the second wavelength, resulting in the closest integer wavelength for each pixel value, and adding the high resolution distance value to the closest integer wavelength for each pixel value. At this point, the method includes adding $\pi$ to the closest integer wavelength for each pixel value when the closest integer wavelength value is $\pi/2$ greater than the distance value, and subtracting $\pi$ from the closest integer wavelength for each pixel value when the closest integer wavelength value is $\pi/2$ less than the distance value.

In an additional embodiment of the present invention, a method is provide for recording a first hologram image at a first wavelength, recording an first object image at a first wavelength, recording a first reference image at a first wavelength, generating a first phase map at a first wavelength from the recorded first hologram image, first object image and first reference image, recording a second hologram image at a second wavelength, the second wavelength longer than the first wavelength, recording a second object image at a second wavelength, recording a second reference image at a second wavelength, generating a second phase map at a second wavelength from the recorded second hologram image, second object image and second reference image, subtracting the second phase map from the first phase map, resolving the fringe number for each pixel phase value, referencing the digital holographic phase map at the first wavelength, calculating a topographical map of the object.

In accordance with the present invention, a digital holographic phase-imaging system is provided, to include a digital holographic imager to provide a first hologram image, a first object image and a first reference image at a first wavelength and a second hologram image, a second object image and a second reference image at a second wavelength, a phase map generator to receive the first hologram image, the first object image, the first reference image, the second hologram image, the second object image and the second reference image and to generate a first phase map comprising a plurality of pixels at a first wavelength and a second phase map comprising a plurality of pixels at a second wavelength, a contour generator to determine the fringe number of the plurality of pixels of the plurality of phase maps, and a resolution generator to produce sub-wavelength resolution of the object image.

The digital holographic imager of the present invention further including a first laser source to illuminate a reference mirror and a target object to generate the first hologram image, the first object image and the first reference image at the first wavelength, a second laser source to illuminate a reference mirror and a target object to generate the second hologram image, the second object image and the second reference image at the second wavelength, and an image capture and storage device to transmit the first hologram image, the first object image, the first reference image, the second hologram image, the second reference image and the second object image to the phase map generator.

In accordance with the present invention, multiple phase maps are generated through the use of digital holography and analyzed using a software program. By using two different wavelengths to generate phase maps, the $2\pi$ ambiguity can be resolved without the use of phase unwrapping algorithms.

In a specific embodiment of the present invention, a method of holography using a Michelson interferometer with the reference mirror tilted off axis is provided. The hologram is recorded using a monochromatic digital camera. Through the use of Huygens' wavelet principle and fast Fourier transforms the original object is reproduced not only in intensity but also in phase. It is the reproduction of the phase maps that allows the topographical contours to be generated.

Once the phase maps have been obtained using digital holography, the two-phase maps are subtracted from each other giving a beat wavelength. The beat wavelength will be longer and can be used to resolve the fringe number that a pixel's phase value is on, resolving the $2\pi$ ambiguities. The shortest wavelength phase map is then referenced to generate high, sub-wavelength resolution. In this way, a topographic map can be produced which has a resolution of 10 nm over several wavelengths with no ambiguities.

BRIEF DESCRIPTION OF THE DRAWINGS

For a fuller understanding of the nature and objects of the invention, reference should be made to the following detailed description, taken in connection with the accompanying drawings, in which:

FIG. 5 Illustrates equations 2.1 to 2.12 as referenced in the specification.

FIG. 12 Illustrates a wiring diagram for the program that generates phase maps from simulated objects in accordance with the present invention.

FIG. 15 Illustrates a set of graphs wherein the top graph is original line, middle graph is a reproduction with errors at fringes, and bottom graph is final reproduction.

FIG. 17 Illustrates the original smiley face object and recreated object.

FIG. 21 Illustrates equations 7.1 to 7.5 as referenced in the specification.

DETAILED DESCRIPTION OF THE PREFERRED EMBODIMENT

Figure 1:
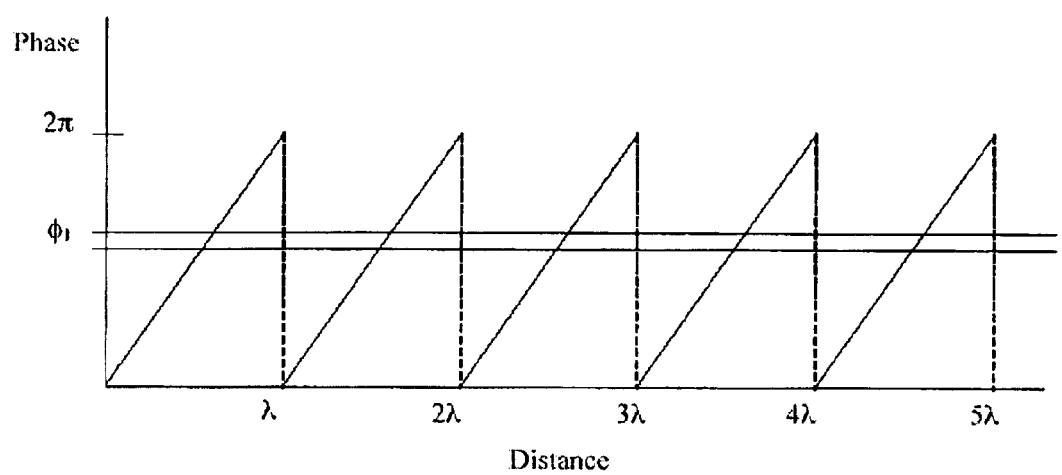
FIG. 1 Illustrates a phase plot vs. distance for arbitrary wavelength.

According to the present invention, holograms are produced off-axis, wherein the angle between the reference beam and the object beam is greater than zero. The angle of separation between the reference beam and object beam is chosen in such a way as to make the hologram appear just separated from the zero order diffraction. Off-axis holograms are employed so that $|O|^2$ and $|R|^2$ patterns do not strongly influence the hologram during reconstruction. In on-axis holography, $|O|^2$ and $|R|^2$ fall on top of the hologram and can completely mask the image. The off-axis geometry is also chosen because it spatially separates the virtual image from the real image. One appears to the left of the zero order diffraction and the other to the right. In on-axis holography, the virtual image and real image are both at the location of the zero order diffraction. While $|O|^2$ and $|R|^2$ can be subtracted off from the recorded image, the virtual image cannot. The use of off-axis geometry has the added benefit of reducing intermodulation noise. Intermodulation noise is created from interference of different parts of the object wave with other parts of the object wave. If the object is small and far away, the spatial frequency of this noise should be lower than that of the interference of the object wave with the reference. This means that the intermodulation noise will be more aligned with the zero order diffraction than the desired holographic image. The angle of separation between the reference beam and the object beam is kept small so that the spatial frequency of the interference does not exceed the pixel separations in the camera which could cause aliasing, another undesired effect due to lack of pixels.

Once H is recorded, $|O|^2$ and $|R|^2$, the intensity patterns of the object and reference beams, are subtracted off. They are recorded separately by taking a picture of $|O|^2$ with the reference beam blocked and then taking a picture of $|R|^2$ with the object beam blocked. We do this to eliminate the zero-order diffraction completely. This leaves us with only the cross terms. One represents a real image, and the other represents the virtual image.

The final hologram, which consists of only the cross terms, is what gets saved to a file. The original image is reproduced by simulating a reference wave hitting the recorded hologram. Huygens' wavelet theory is used to reproduce the electric field resulting from a coherent plane wave striking the hologram. Each point is allowed to emit a complex wave, which has an amplitude proportional to the intensity value of that recorded pixel. In this way, the resultant complex electric field can be calculated at any arbitrary plane. Reproducing the original object requires calculating the electric field at the position that the original object was recorded.

In Equation 2.3, E(x, y; z) is the electric field at any arbitrary point. $E_0(x_0, y_0)$ is the electric field at a point on the hologram. Distance from one point in the hologram plane to a point in the image plane is r and wave number is k.

Figure 2:
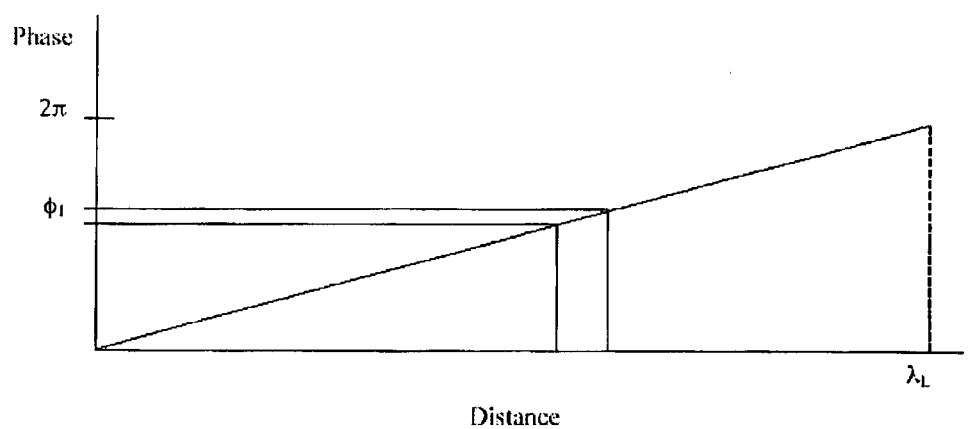
FIG. 2 Illustrates a phase vs. distance plot for a significantly longer wavelength.

Since the electric field is complex, the choice can be made to view only the phase factor of the electric field. By viewing the phase factor information about the height of the object's surface is identified. FIG. 1 shows how phase and the z distance are related. Sub-wavelength detail can be generated directly from the phase map. Notice, however, that the phase rises to $2\pi$ and then repeats. For a given phase there exists many different possible z distances which could have generated it. This means that if it is desired to have full detail about the object, it has to have no features that extend past $\lambda$. Therefore, a longer wavelength is used to examine a larger object. The problem here is that for a given uncertainty in phase, the uncertainty in distance goes up as $\lambda$ goes up, as shown in FIG. 2.

If both a short wavelength and a long wavelength are used, it is possible to examine a larger object and still have high resolution. The object would first be imaged with the long wavelength; this would provide a range of the object's position in space. Then image with the short wavelength to get higher resolution. The idea is to use the longer wavelength to resolve the degeneracies of the shorter wavelength. The longer wavelength is used to give information about which $2\pi$ repetition the object point is on. This requires that the uncertainty in distance given by the longer wavelength be less than the shorter wavelength.

Figure 3:
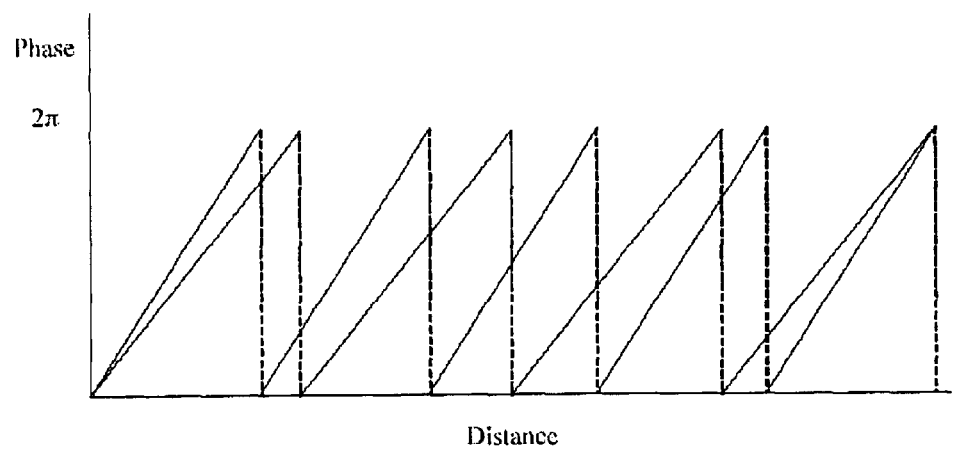
FIG. 3 Illustrates a phase vs. distance plot for two slightly different wavelengths.
Figure 4:
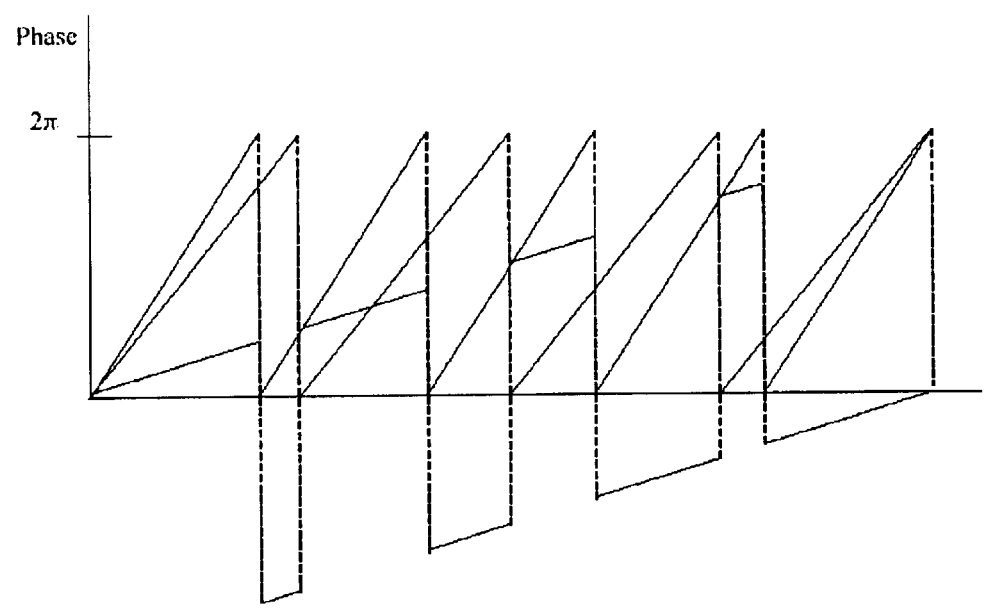
FIG. 4 Illustrates a phase vs. distance plot for two slightly different wavelengths.

If the first wavelength is in the visible range of the spectrum, then the second must be significantly longer, in the infrared. Instead of using an infrared laser, the longer wavelength can be simulated by using a difference of wavelengths. Two phase plots could be made using $\lambda_1$ and $\lambda_2$ with one subtracted from the other to produce a beat wavelength. This way, instead of using two very different wavelengths, two visible wavelengths that are close together can be used. FIG. 3 shows the two phase plots simultaneously. FIG. 4 shows the same as FIG. 3 with a line added showing a subtraction of the two wavelengths.

The graph of the wavelength subtraction appears to be discontinuous at first, but if all the negative phases are raised by $2\pi$, a continuous linear graph results. This graph is described by Equation 2.4, where m is the slope, x is the axial distance, and $\phi$ is the phase difference.

The resultant slope, in radians per nanometer, is given by Equation 2.5 wherein $\lambda_1$ is the longer of the wavelengths, and $\lambda_2$ the shorter. As mentioned above, the uncertainty in distance of the beat wavelength must be no more than $\lambda_2$. Using the equation for a straight line for the graph of the longer wavelength results in Equation 2.6 where $\Delta\phi$ is the uncertainty in phase expressed in radians. Then solving for the maximum allowed uncertainty in phase is as provided in Equation 2.7. The result is the uncertainty in phase of the beat wavelength. Since the beat wavelength was produced by subtraction of two other wavelengths, this phase uncertainty is the sum of the two wavelengths' uncertainties. If the two wavelengths are close and the uncertainties are the same, Equation 2.8 is used where $\Delta\phi_s$ is the phase uncertainty of each wavelength. The maximum scan distance achievable is given by the beat wavelength, $x_r$, the distance at which the beat phase map repeats as provided in Equation 2.9. The last two relations can be used to get a new equation relating the maximum achievable scan distance to a given phase uncertainty (Equation 2.10). The resolution of the system is given by the short wavelength's phase map (Equation 2.11). The repeat distance is determined by the separation of the two wavelengths. No matter how much noise is in the system, the beat wavelength is what determines the scan range of the system. There is a limit, however, to how long the beat wavelength can be. If the beat wavelength is too long, then the uncertainty in distance will be greater than the single frequency wavelength, causing the system to inaccurately determine the fringe number.

Using Equation (2.10), an $x_r$ can be calculated to be about 20 $\mu$m, which sets the maximum scan distance due to the system's noise limitations. Rearranging Equation (2.9) determines what the second frequency should be to achieve this scan distance (Equation 2.12).

According to one embodiment of the present invention, using this equation, it is determined that $\lambda_1$ should be 653.5 nm. If a wavelength shorter than 653.5 nm is used, the program will no longer be able to determine what fringe number a point is on. This will cause the surface to have erratic discontinuities. If a wavelength longer than the calculated 653.5 nm is used, the scan range will be shorter but the program will still be able to determine which fringe number a point is on. This will allow the program to read the single wavelength phase map and produce the 10 nm resolution.

The following system and method embodiments are exemplary and as such are not intended to limit the scope of the invention.

Figure 6:
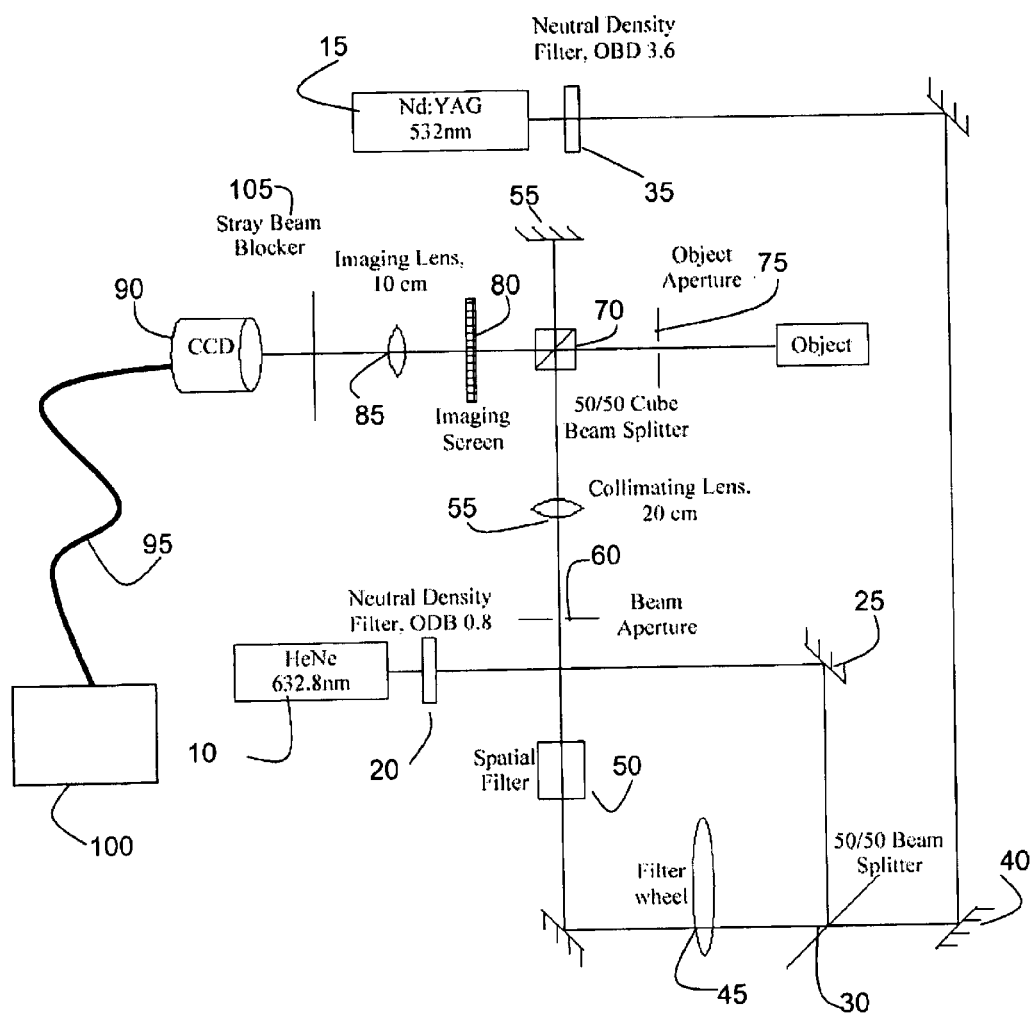
FIG. 6 Illustrates a diagrammatic view of the setup of the two laser system in accordance with the present invention using a Nd:YAG and a HeNe laser.

An exemplary embodiment in accordance with the present invention is provided as shown in FIG. 6. In this embodiment, the two frequency sources chosen were an HeNe laser 10 at 632.8 nm and a frequency doubled Nd:YAG Coherent DPSS 532 laser 15. The HeNe laser is first attenuated using an OD 0.8 attenuator 20. It is then steered toward a beam splitter 30 using a mirror 25. At the beam splitter it is combined with the Nd:YAG laser beam. Before the Nd:YAG laser comes to the beam splitter it is attenuated by OD 3.6 attenuator 35. It is then reflected off a steering mirror 40 toward the beam splitter 30. Once the beams are properly aligned with each other they pass through a filter wheel ranging from OD 0.04 to OD 2.5. The purpose of the filter wheel is to make it easy to change the overall intensity of the system for use on targets with different reflectivity. The combined beam line passes through a spatial filter 50 to clean up the beam profile. The beam is then collimated using a 20 cm achromatic lens 55. The collimated beam is sized using a circular aperture 60 of about 7 mm in diameter. This beam is then sent through a cube beam splitter 65 which separates the beam into reference and object beams. The reference is filtered to make the intensity of the object beam and reference beam roughly equal. The reference beam mirror 70 is given a slight tilt off-axis. The object beam is sent through a 5 mm×2 mm rectangular aperture 75. The beams recombine through the beam splitter and are sent through a calibrated, transparent window 80 used as the image screen. It has hash marks on it used for measuring the size of the visible screen. A 10 cm achromatic lens 85 is set up in front of a CCD camera 90 at a distance of 15 cm. The camera is set to focus at infinity. The combination of setting the camera to focus at infinity and the ten centimeter lens makes the camera focus on the transparent window. The camera signal is sent through a connector 95 to an image acquisition card 100. The images are all recorded as bitmaps to avoid compression errors.

Thick neutral density filters are used because thin neutral density filters cause noticeable interference patterns to form in the beam. These interference patterns cause errors in the calculation of phase. The filters are also all turned slightly off normal to prevent back reflection from entering the system. The cube beam splitter is also chosen over a wedged plate beam splitter because the wedged plate beam splitter produces some interference patterns. The cube, despite being coated with a first order antireflection coating, exhibits back reflections and is tilted slightly down. There is a beam block 105 placed a few centimeters away from the camera lens. It was found that most of the stray reflections focused around this point. These stray reflections are blocked without blocking the object and reference beams.

Figure 7:
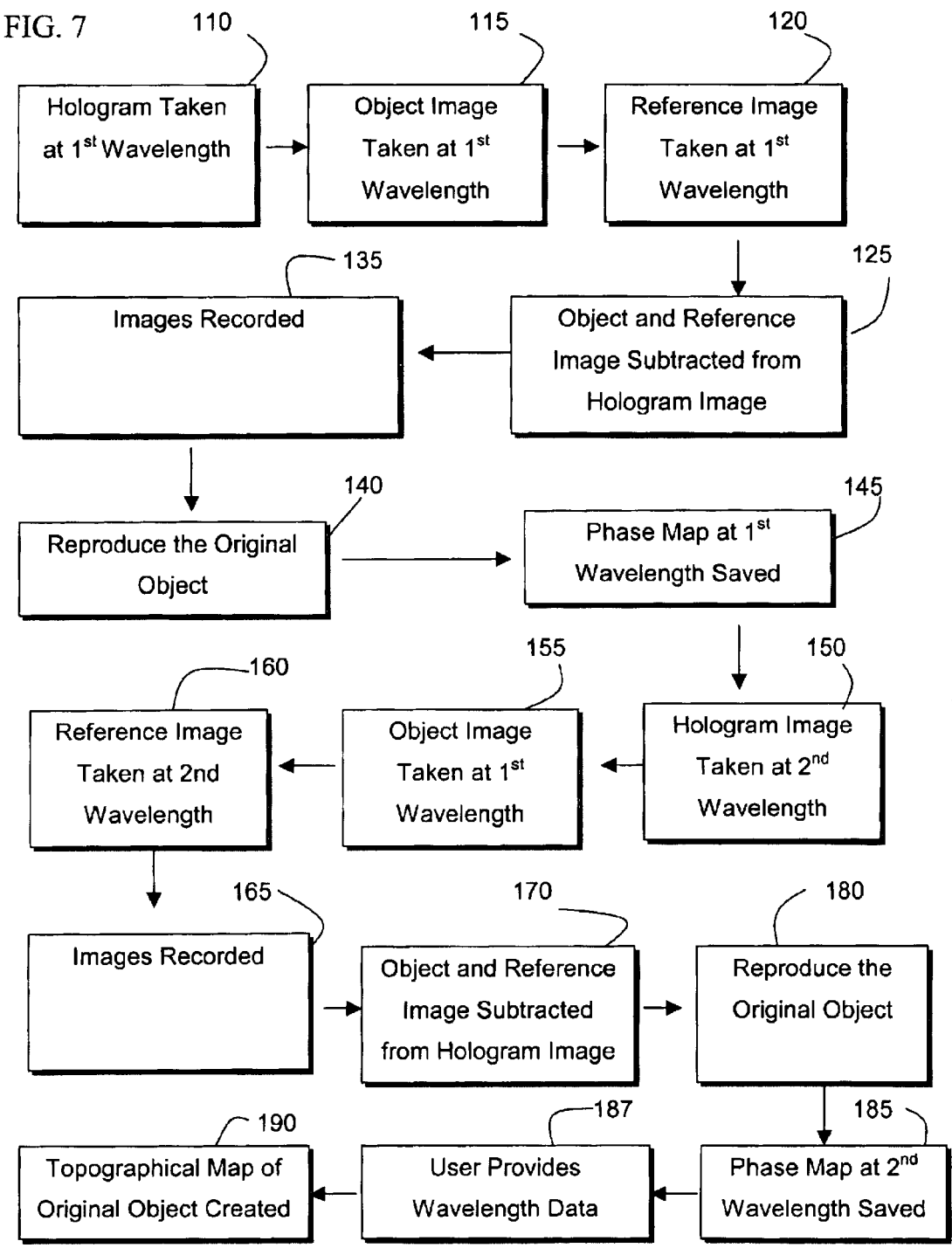
FIG. 7 Illustrates a flow diagram of the holography method in accordance with the present invention.
Figure 8:
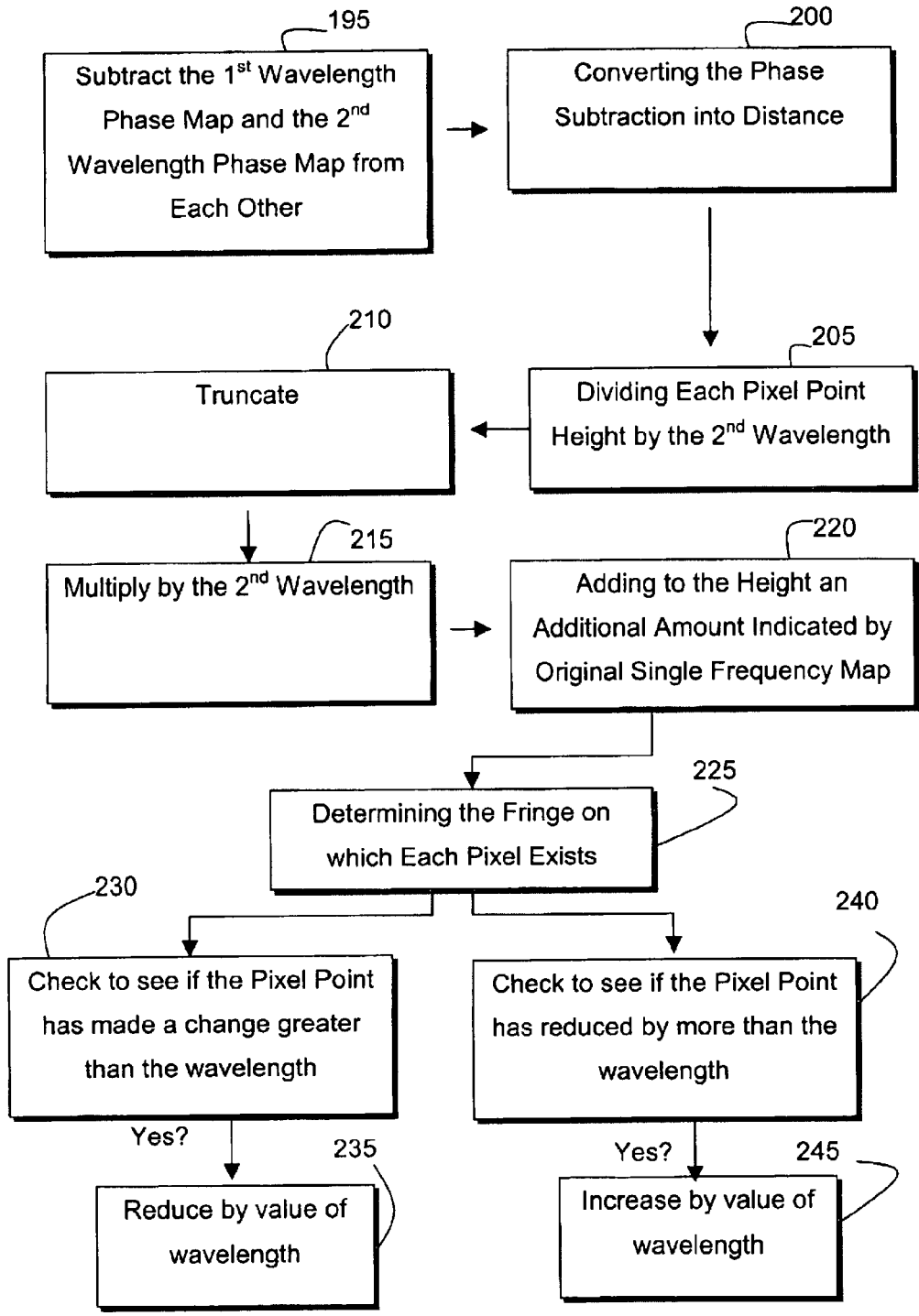
FIG. 8 Illustrates a flow diagram of the fringe determination in accordance with the present invention.

In an exemplary embodiment in accordance with the method of the present, with reference to FIG. 7 and FIG. 8, the HeNe laser and YAG laser are turned on and allowed to warm up for about 20 minutes. The HeNe beam is first completely blocked and a hologram is taken using only the YAG 110. The object to be imaged is put into position and aligned. The images are recorded. This first image is the hologram H, wherein both object and reference beams are from the YAG. Next, the reference beam is blocked. This image recorded is the object, $|O|^2$ 115. Then the object beam is blocked and only the reference, $|R|^2$, is recorded 120. Once these three images are recorded, the program takes the first image and subtracts off the second and third 125. This final image is the recorded hologram. A program is then run to reproduce the original object. The user provides the program the distance of the object 135. The program starts from the recorded hologram and uses Huygens' wavelet principle to propagate the electric field. The electric field is allowed to propagate mathematically until it reaches a distance equal to that of the object distance. The program does this for all points in the hologram plane to all points in the object plane 140.

In accordance with an exemplary setup embodiment of the present invention, the area of the object that is illuminated is 5 mm×2 mm. The capture area on the camera is set to 5 mm×5 mm to allow for the off-axis hologram. The 5 mm×2 mm rectangle is placed so that it is on the left side of the screen. The final projected image is calculated into a 5 mm×5 mm area. When zero tilt angle is entered into the program, the zero order diffraction appears on the screen in the same location as the original 5 mm×2 mm aperture. The holographic image appears to the right of the zero order diffraction.

The program allows the user to view the intensity, the phase, and the real and imaginary parts of the reproduced object. The program can also change the angle of the plane at which the object is recreated. This is equivalent to viewing the object from a different angle. This is a very useful feature for flat objects because the off-axis hologram reproduces the image as having a horizontal tilt equal to the angle of the reference mirror. This would generate phase maps that exceed the repeat distance and cause wrap around. The angle is selected so that the phase maps have the least number of fringes. This can also compensate for any tilt the object may have originally had. The phase map is then saved for later use 145. The YAG beam is now blocked and the HeNe beam is unblocked. The first image is the hologram H, wherein both object and reference beams are from the YAG 150. Next, the reference beam is blocked. This image recorded is the object, $|O|^2$ 155. Then the object beam is blocked and only the reference, $|R|^2$, is recorded 160. Once these three images are recorded, the program takes the first image and subtracts off the second and third 165. This final image is the recorded hologram. A program is then run to reproduce the original object 170. The user provides the program the distance of the object 175. The program starts from the recorded hologram and uses Huygens' wavelet principle to propagate the electric field. The electric field is allowed to propagate mathematically until it reaches a distance equal to that of the object distance. The program does this for all points in the hologram plane to all points in the object plane 180. Once again, we save the phase map produced with the second laser 185.

With reference to FIG. 8, now that the phase maps are saved, a second program is initiated 187. This program allows the user to select two files and input the wavelengths at which these files were recorded. From this, the second program is able to calculate a topographical map of the original object 190. The program needs object size, distance, number of pixels used, and wavelength at which the hologram was recorded to be entered by the user. The program allows absolute value, phase, real, and imaginary parts of the reconstruction to be viewed. The second program, does the actual phase subtractions and calculations. Refer to FIG. 21 for a wire diagram of this program. The first step in the program is to subtract the two phase maps from each other 195. Then the subtraction is modulo $2\pi$. The next step converts the phase subtraction into distance 200 using the equations described above in Equation (2.4). The program gives a visual output at this point but it does not have the resolution that a single frequency phase plot would have because the noise in the original phase plot is amplified here. The next part of the program takes each point's height and divides by $\lambda_2$ 205. The result is then truncated 210 and multiplied by $\lambda_2$ 215. This brings the height value down to the closest integer wavelength. The next step adds to the height an additional amount indicated by the original single frequency phase map 220. The original phase map contains high resolution distance information and we use the subtraction to find out which fringe the point is on 225. There is a problem, however, when a point lies on the edge of a fringe. The random noise of the system can push the point to the next fringe. This results in the point suddenly jumping by $\lambda$ in height. A simple "if" statement 230 checks to see if the point has made a change greater than $\lambda/2$ from the phase subtraction. If it has, it is reduced by exactly $\lambda$ 235. A second "if" 240 statement checks to see if the point has reduced by more than $\lambda/2$. If it has, the height value of the point is raised by $\lambda$ 245. The final image should have the resolution of a single frequency phase map with a scan length determined by the separation of the two frequencies used.

Figure 22:
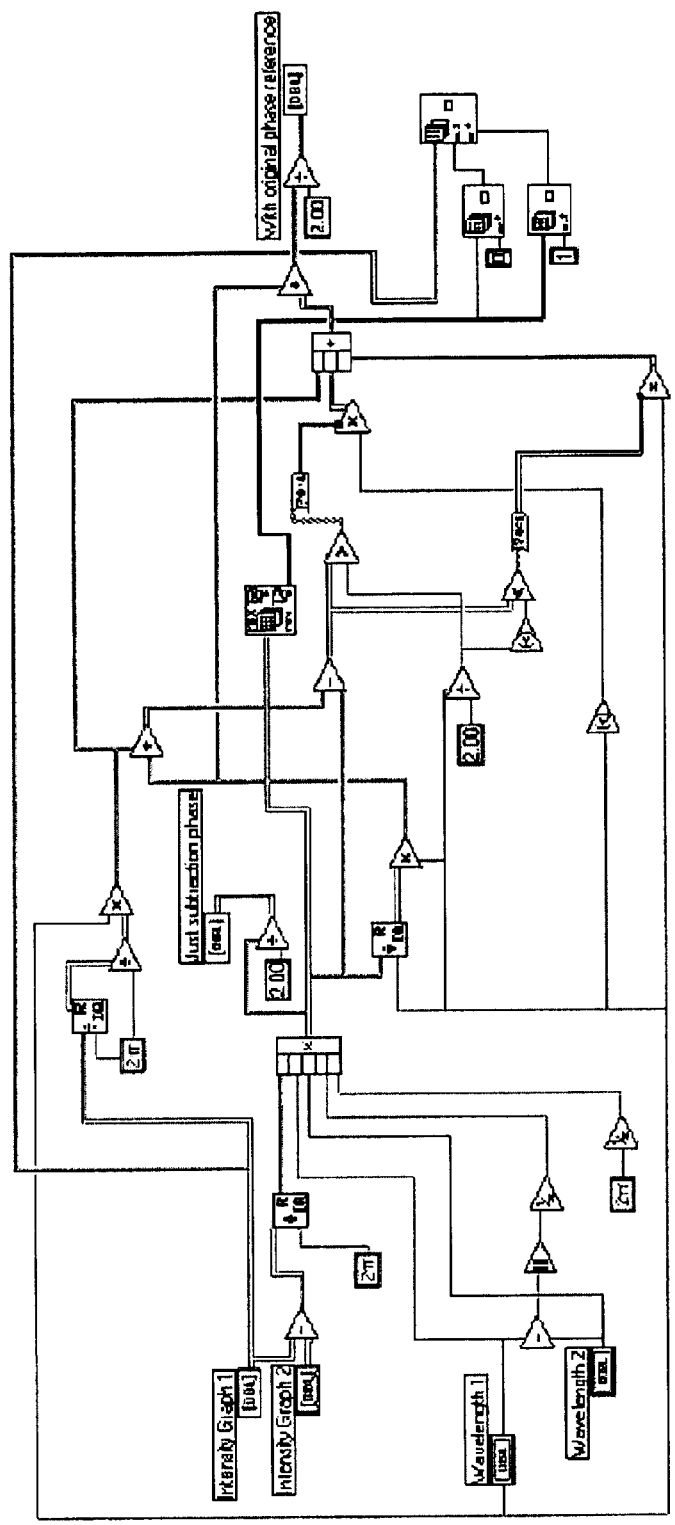
FIG. 22 Is an illustrative figure obtained using a Nd:YAG for $\lambda_1=532.00$ nm and a HeNe for $\lambda2=632.80$ nm.
Figure 23:
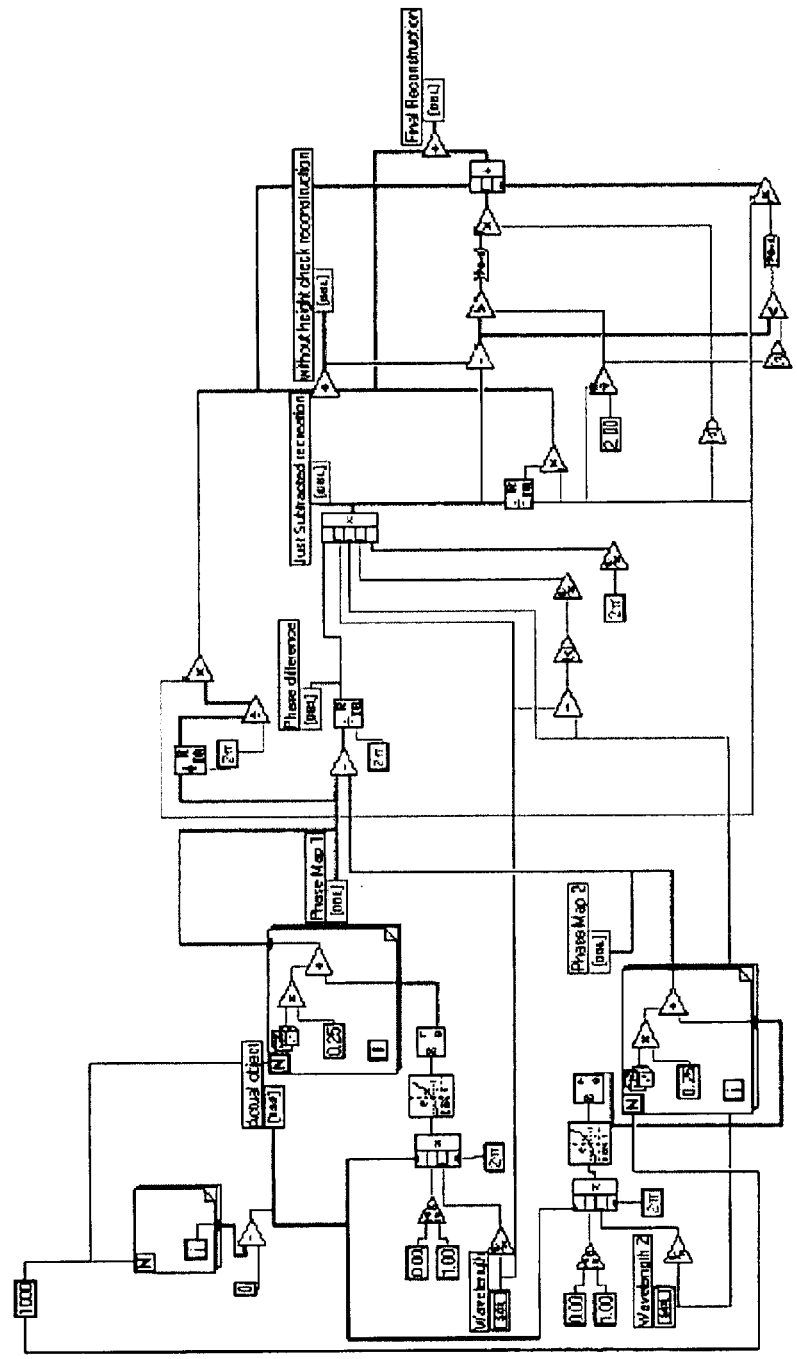
FIG. 23 Is an illustrative diagram of sphere used to calculate radius of curvature of mirror.
Figure 24:
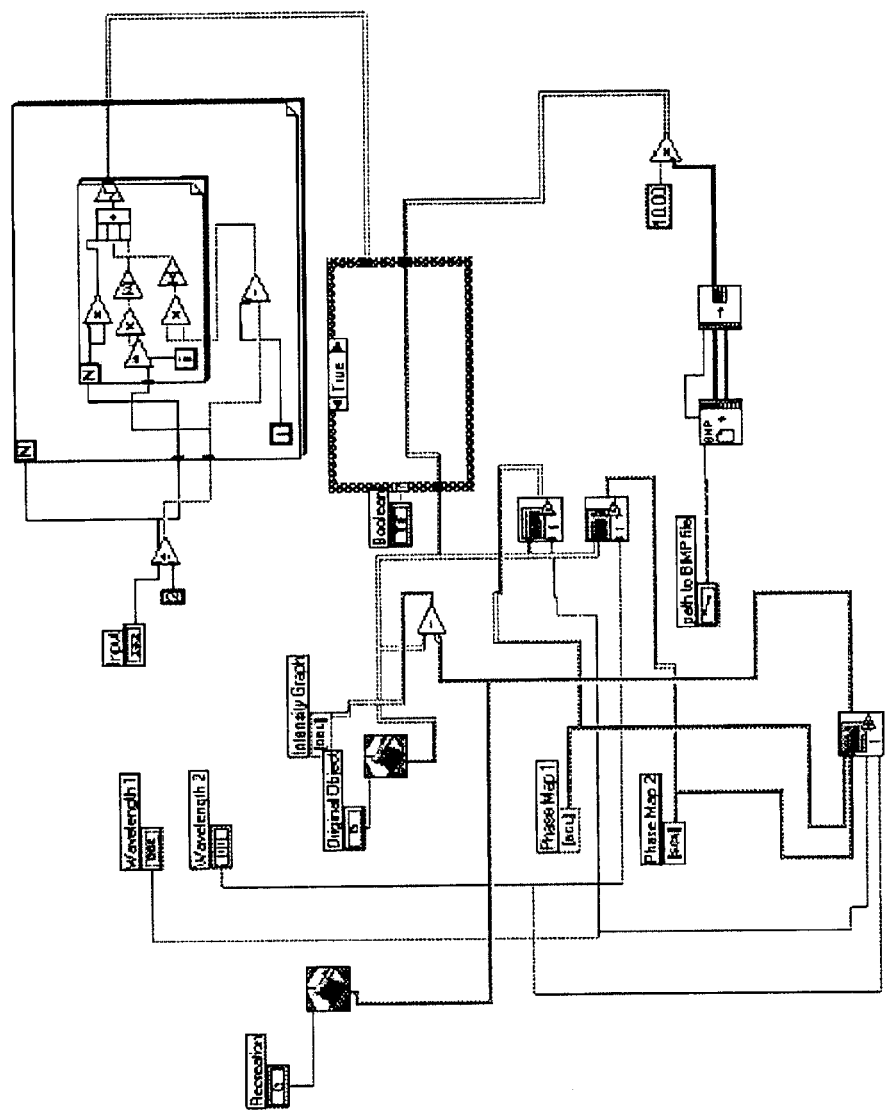
FIG. 24 Illustrates the result in accordance with the present invention when a sphere of a 120 cm radius is subtracted from the recreation of the mirror.
Figure 25:
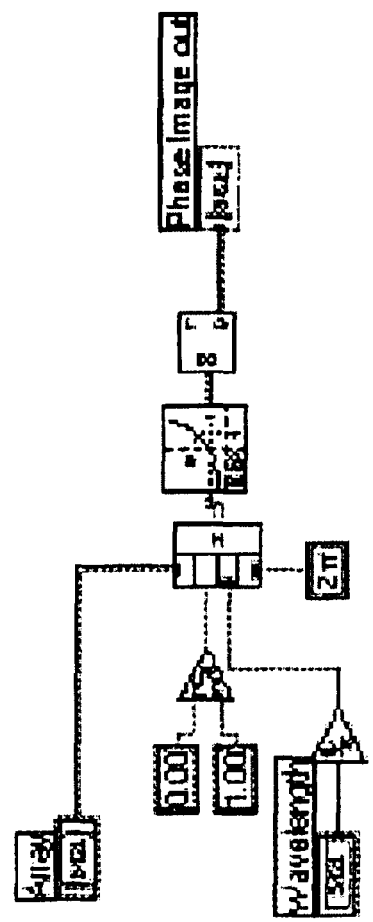
FIG. 25 Illustrates two slices of the result when a cure of 120 cm radius is subtracted from the recreated mirror surface.

To test the principles of two-wavelength contouring as disclosed by the present invention, two simulation programs were written. The first program is a very basic one-dimensional program that tries to image a line in space. See FIG. 22 for the wiring diagram of the program. The second program is a two-dimensional simulation program and is able to analyze real data. See FIG. 23 and FIG. 24 for the wiring diagrams of the program.

Figure 9:
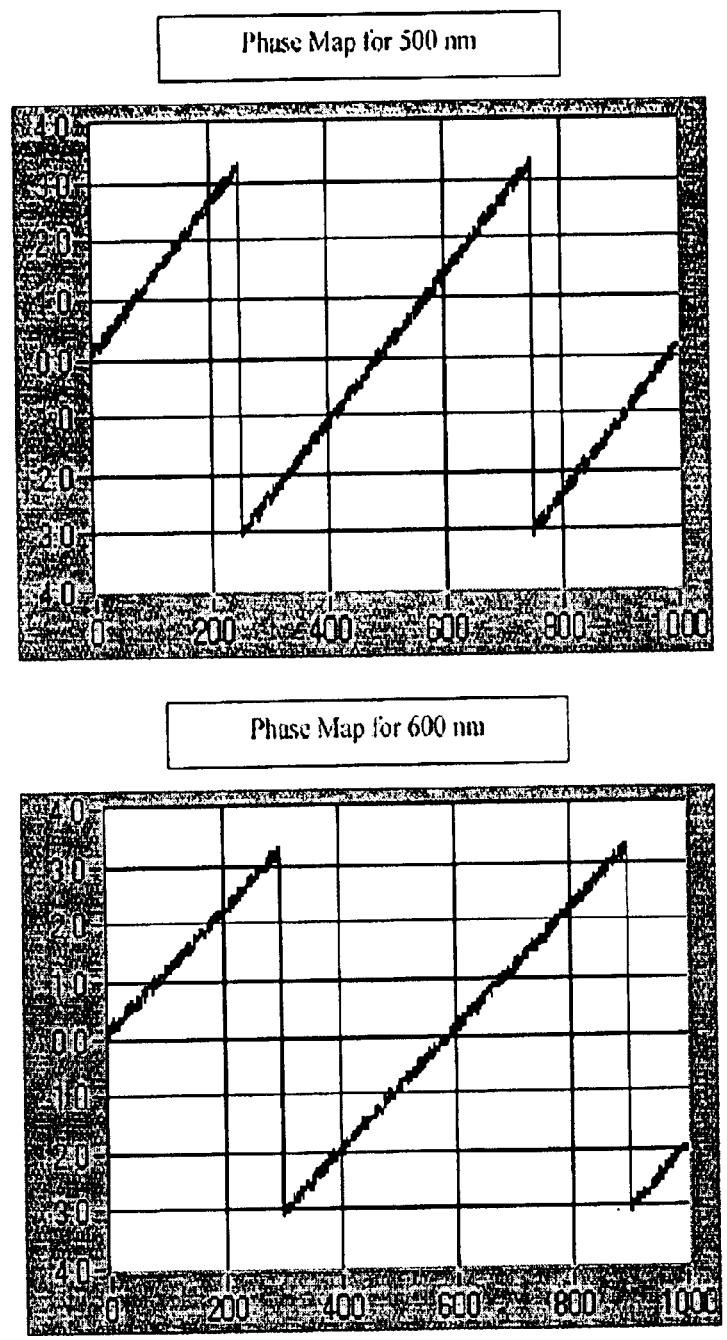
FIG. 9 Illustrates a wiring diagram for the phase subtraction program in accordance with the invention.
Figure 10:
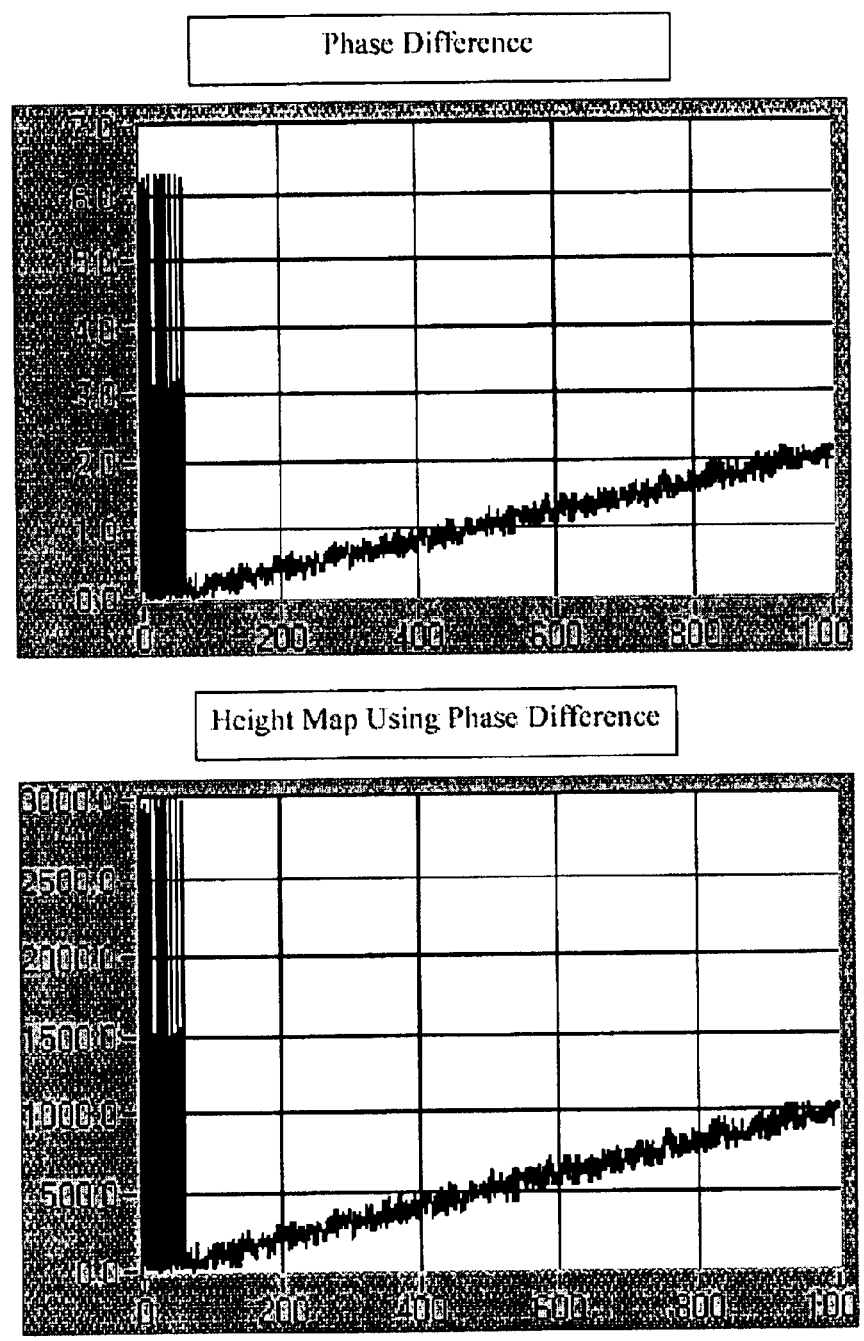
FIG. 10 Illustrates a wiring diagram for the one dimensional simulation program in accordance with the invention.
Figure 11:
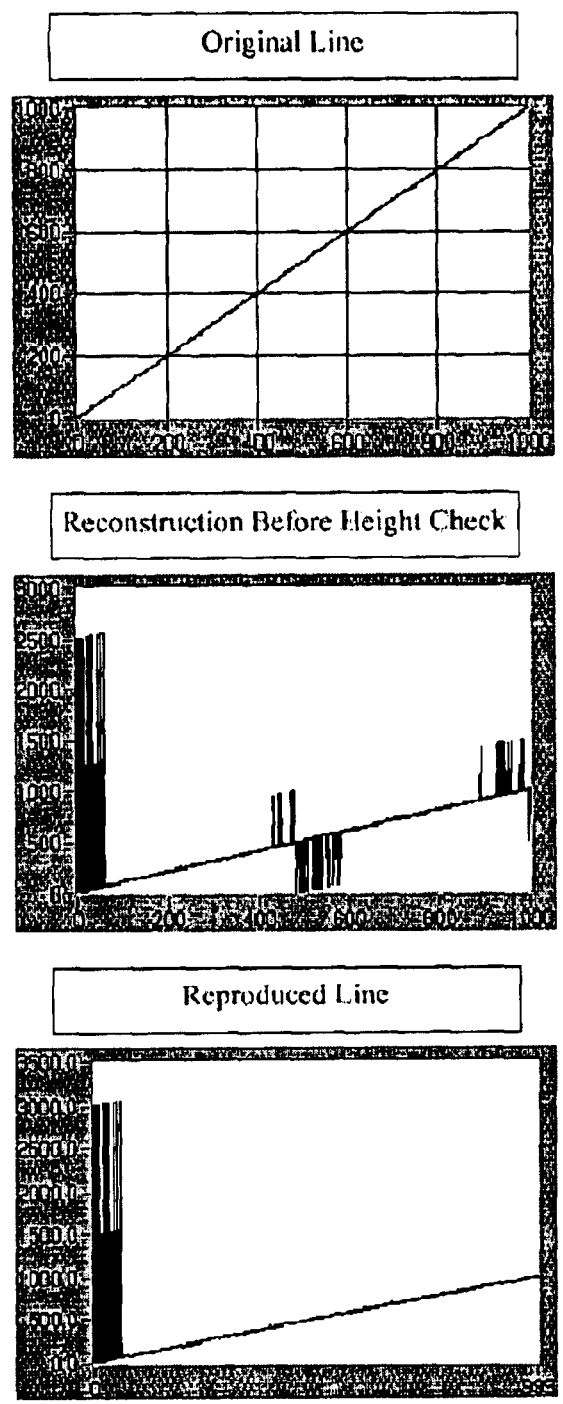
FIG. 11 Illustrates a wiring diagram for the two dimensional simulation program in accordance with the invention.

The one-dimensional simulation uses a line at a forty-five degree incline. This is the top graph in FIG. 10. The phase of the light coming from the line is calculated and used for comparison in later parts of the program. To simulate a real world system, the user can add noise to the phase. FIG. 9 shows the phase vs. distance plot for the first wavelength and the second wavelength. In this simulation, the first wavelength is 500 nm and the second is 600 nm. The noise can be seen in both these figures as slight, jagged bumps on the line. From inspection it is seen that for zero distance the phase of both graphs is zero plus the value of the noise. From there, the phase varies from $-\pi$ to $\pi$ as distance varies from $(n+\frac{1}{2})\lambda$ to $(n+1\frac{1}{2})$ The phase approaches $\pi$, then suddenly drops to $-\pi$, and then increases as distance increases. Both of the phase plots suffer from this ambiguity. In FIG. 11 the phase plot of $\lambda_2$ has been subtracted from $\lambda_1$ and corrected for negative values. The bottom graph in FIG. 11 is just the top graph multiplied by the appropriate beat wavelength to convert phase difference into a distance. The noise appears to have increased in size. The middle graph in FIG. 11 is after the program looks at the original phase map to correct for this amplified noise. It can be seen in this figure that there are still some discontinuities that are not in the original line. This is corrected by the final part of the program. The bottom graph in FIG. 11 is the final output. There is a good match between the original line and the final output; however, the user-added noise is still there.

Figure 13:
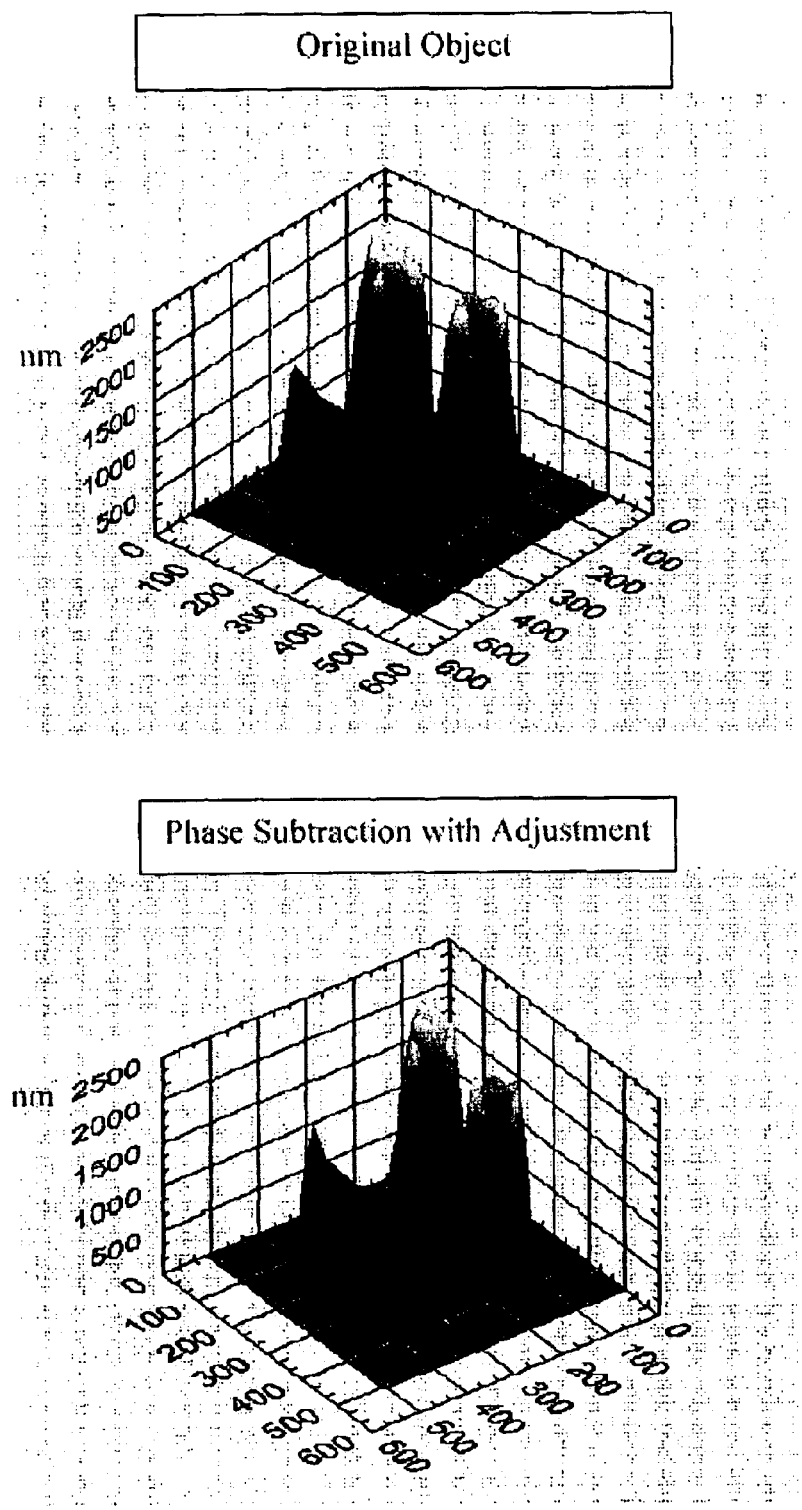
FIG. 13 Illustrates the phase maps for 500 nm and 600 nm wavelengths.

In accordance with the present invention, the program allows the user to load a pre-drawn, 8-bit, grayscale bitmap. The value of each pixel of the grayscale drawing, 0–255, is multiplied by 10 nm to convert it into height. To test the simulation on a complex object, a smiley face drawn in a computer drawing application using an airbrush tool was used. The top of FIG. 12 shows the phase plot of the smiley face for 532 nm. It can be seen in this figure that there are several contour lines due to the height of the object exceeding 532 nm. The bottom of FIG. 12 shows the phase plot for 632 nm. This figure also displays multiple contour lines. Once the program has the two phase maps generated, it begins to recreate the object. The top of FIG. 13 shows the original three-dimensional object and the bottom shows the recreation. The final recreation closely resembles the original.

Figure 14:
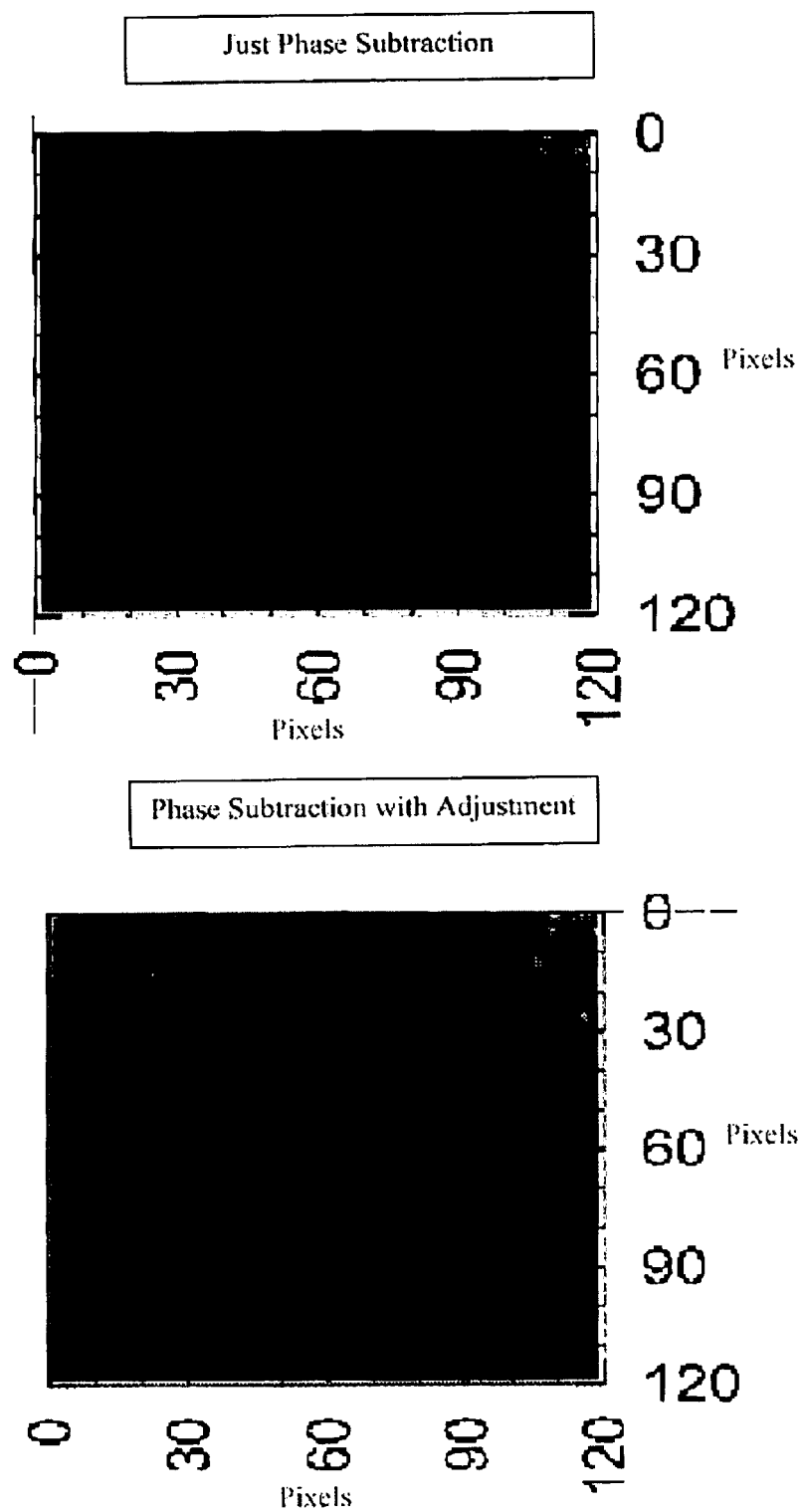
FIG. 14 Illustrates a graph of a plot of phase difference vs. distance.
Figure 16:
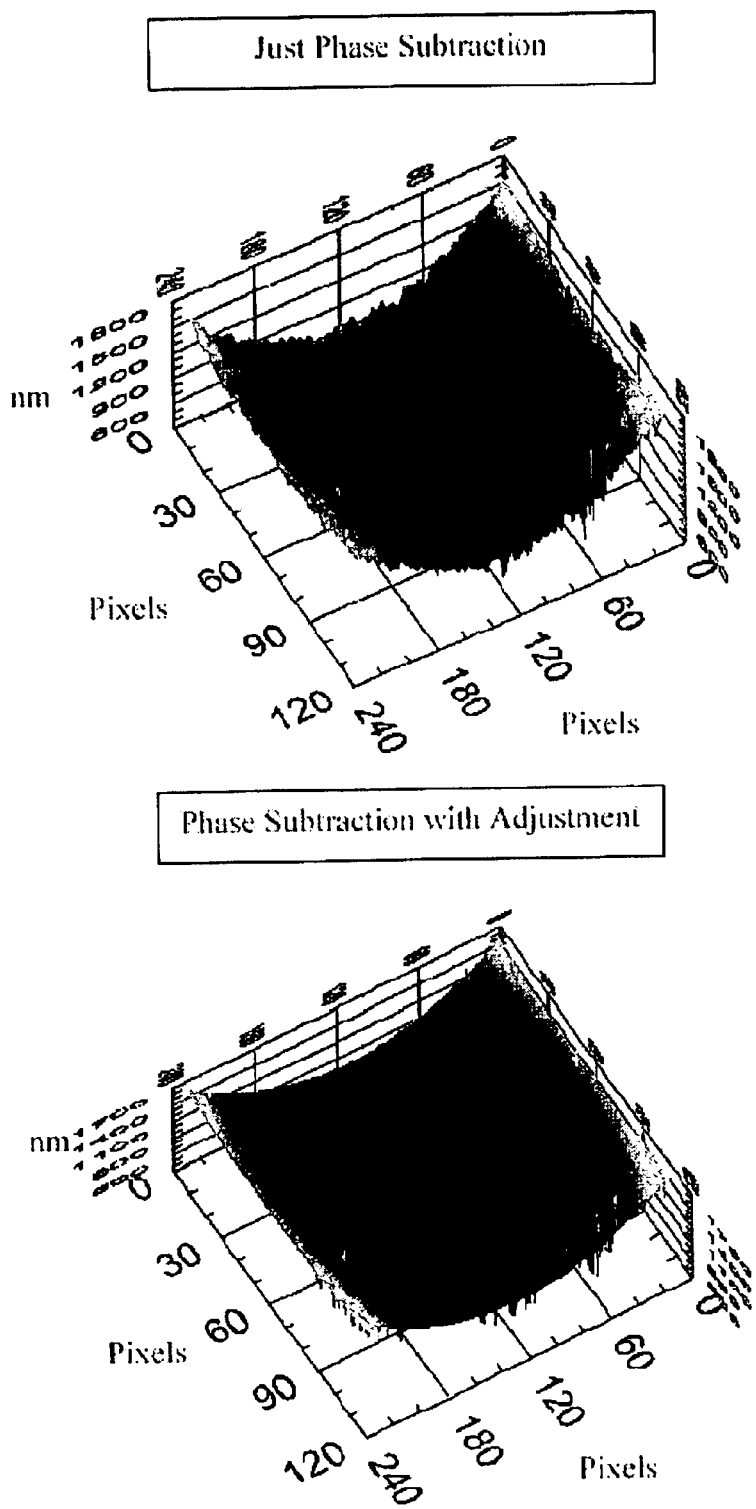
FIG. 16 Illustrates the phase plots of smiles face for 532 nm wavelength and 632 nm wavelength.

An additional exemplary embodiment of the present invention is provided in which a frequency doubled Nd:YAG laser was used for the green wavelength. These both gave very stable intensities and phase over time. This also allowed a much larger separation in the wavelengths. With the HeNe at 632.8 nm and the YAG at 532.0 nm, this gives a separation of 100.8 nm. FIG. 14 shows that the phase subtraction does yield the curvature of the surface. The subtraction has a rather bumpy looking surface. When the single phase map is used to remove the noise, a very clean surface is produced. FIGS. 15 and 16 are different views of this data. FIG. 17 is a two-dimensional slice of the mirror. This cross section shows very clearly the curvature of the mirror and the ability of the system to get fine resolution over several wavelengths.

Figure 18:
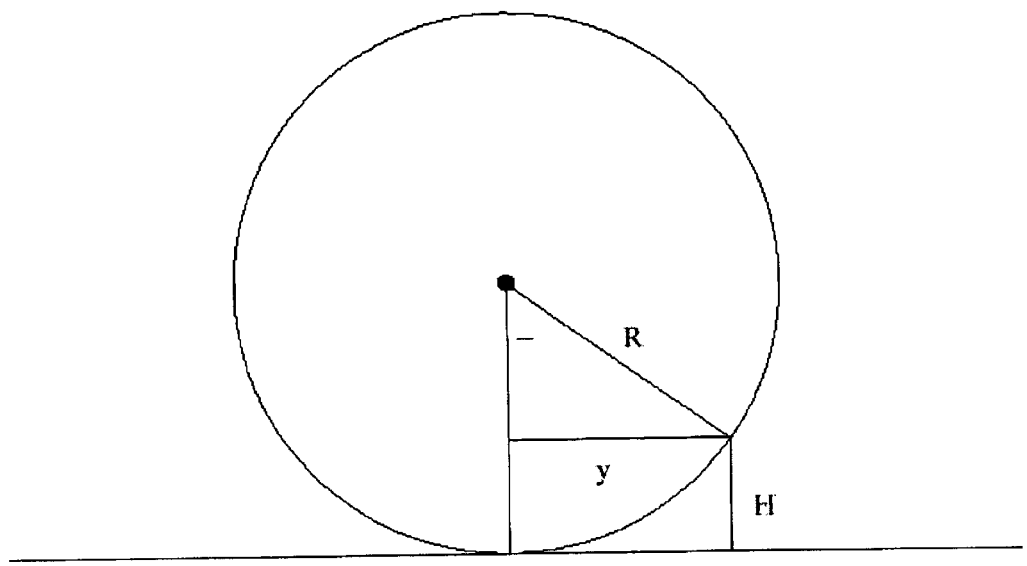
FIG. 18 Is an illustrative figure obtained using a Nd:YAG for $\lambda_1=532.00$ nm and a HeNe for $\lambda2=632.80$ nm.

An additional exemplary embodiment in which the ability of the system is checked to reproduce an object by comparing the curvature of the reconstruction with the known curvature of the mirror used. The mirror used is a custom made mirror with 60 cm focal length and a radius of curvature of 120 cm. The radius of curvature of the reproduced curve can be estimated by Equation 7.1 of FIG. 21 (also see FIG. 18).

Using small angle approximation (Equation 7.2), again, using small angle approximation Equations 7.3 to 7.5).

Figure 19:
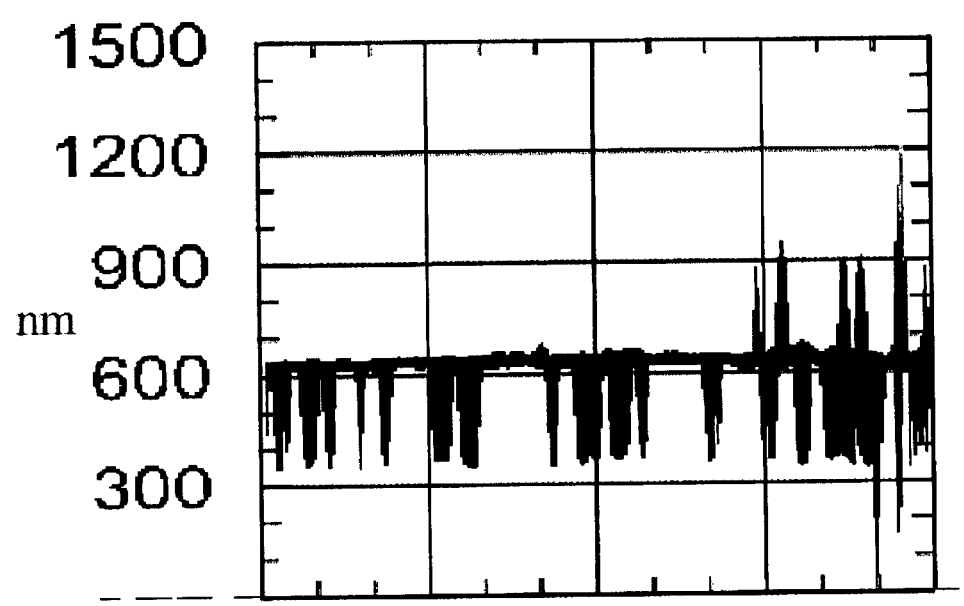
FIG. 19 Is an illustrative figure obtained using a Nd:YAG for $\lambda_1=532.00$ nm and a HeNe for $\lambda2=632.80$ nm.
Figure 20:
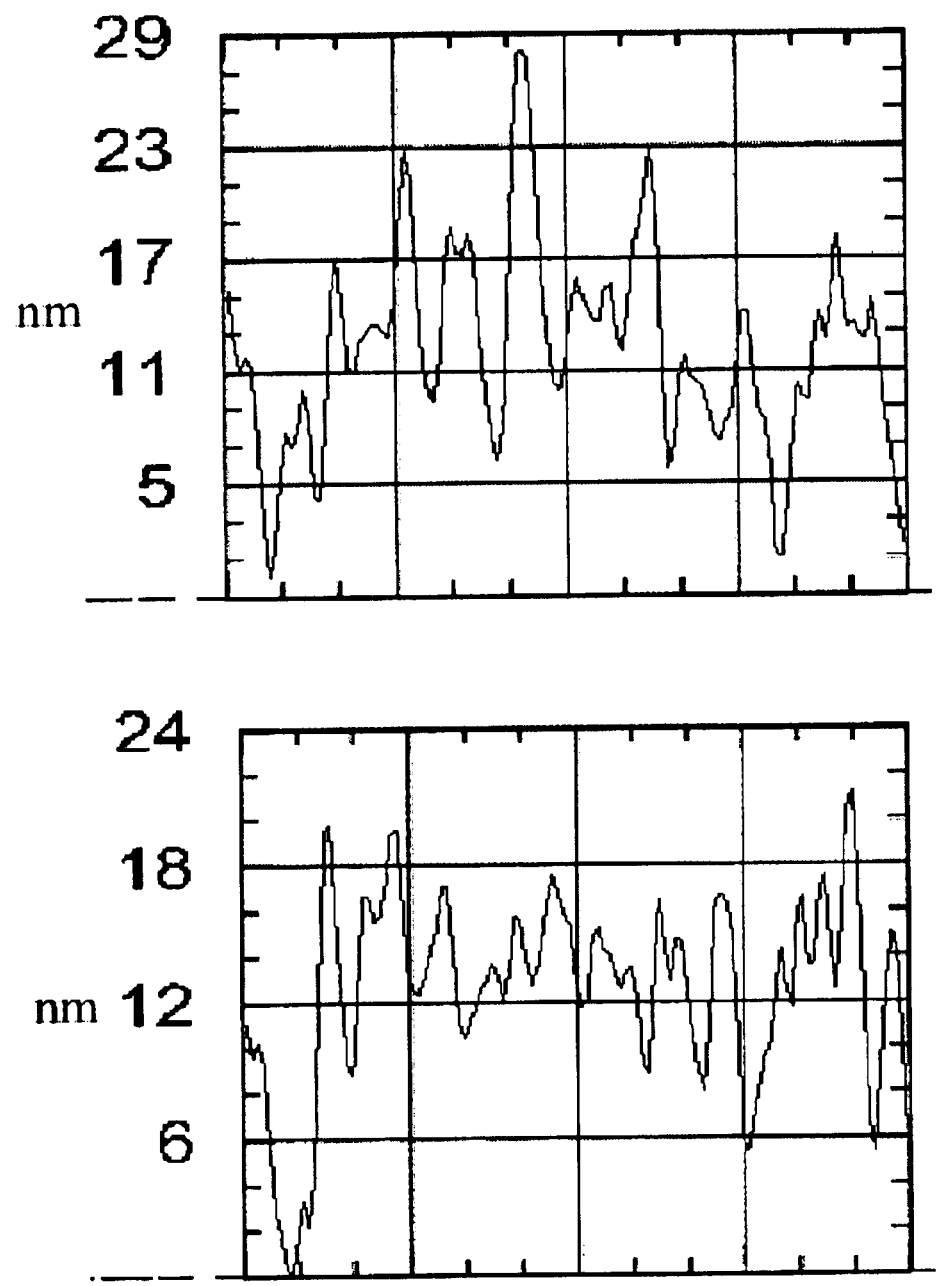
FIG. 20 Is an illustrative figure obtained using a Nd:YAG for $\lambda_1=532.00$ nm and a HeNe for $\pi2=632.80$ nm.

From FIG. 17 we can see that the bottom of the curve touches at 560 nm. The right hand side of the curve rises to about 1430 nm. This gives an H of 870 nm. The picture shows that the array is 230 pixels long. It appears that the distance from center of the mirror to the right edge is 110 pixels. Since is it known that the whole 380 pixel map is 5 mm in length, and we have 110 pixels across, this makes y about 1,450,000 nm. Plugging this value in for y gives a radius of 120 cm. Based on potential uncertainties from estimating distances in FIG. 17, the final calculation has an uncertainty of about ±15 cm. This agrees within experimental uncertainties for our expected value of the radius of curvature. Confirmation of this assumption is provided wherein a full three-dimensional image produces a sphere of 120 cm radius. This was then subtracted from the image in FIG. 18. FIG. 19 shows the difference between the two. This figure is an almost perfectly flat plane which means that the image of the mirror created by the two-wavelength method is very close to the radius of 120 cm. It also means that recreation is a sphere and not a parabola or some other shape. There are still a few random spikes on the subtraction which also can be seen in FIG. 15. These are not accurate reproductions of the mirror surface, but are attributed to noise defects. FIG. 20 shows two slices of the surface generated by subtraction. By inspection, it appears that the surface has fluctuations of about 10 nm. This could be either actual fluctuations in the mirror or uncertainties in the system. From these fluctuations an upper limit of 10 nm can be placed on the system's resolution.

According to an additional embodiment designed to remove systematic error, reduction in the noise in the system is achieved by imaging a flat cleaved crystal. If done properly a cleaved crystal can be flat to within atomic levels. The flat cleaved crystal surface would be imaged in place of the object. Any surface that the system reproduces other than a flat surface represents error in the system. It may be possible to record this surface map and simply subtract it away from all other imaging runs. This should have the effect of removing the systematic error from the system. It would also be a good idea to use a piece of cleaved crystal as the reference mirror. This would eliminate any error caused by an imperfect reference mirror.

It will be seen that the objects set forth above, and those made apparent from the foregoing description, are efficiently attained and since certain changes may be made in the above construction without departing from the scope of the invention, it is intended that all matters containing in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A digital holographic phase-imaging method comprising the steps of:
   generating a digital holographic phase map of an object at a first wavelength;
   generating a digital holographic phase map of the object at a second wavelength;
   subtracting the second phase map from the first phase map;
   resolving the fringe number for each pixel phase value;
   referencing the digital holographic phase map at the first wavelength thereby reproducing the image of the object.

2. The method of claim 1, wherein the step of generating a digital holographic phase map of an object at a first wavelength, further comprises:
   recording a first digital hologram image of the object at the first wavelength utilizing an object beam and a reference beam;
   recording a first digital object image of the object at the first wavelength utilizing an object beam;
   recording a first digital reference image of the object at the first wavelength utilizing a reference beam; and
   subtracting an intensity pattern of the first digital object image and an intensity pattern of the first digital reference image from the first digital hologram image resulting in a digital holographic phase map of the object at the first wavelength.

3. The method of claim 2, wherein an angle between the reference beam and the object beam is greater than zero, thereby producing an off-axis hologram.

4. The method of claim 1, wherein the step of generating a digital holographic phase map of an object at a second wavelength, further comprises:

recording a second digital hologram image of the object at the second wavelength utilizing an object beam and a reference beam;

recording a second digital object image of the object at the second wavelength utilizing an object beam;

recording a second digital reference image of the object at the second wavelength utilizing a reference beam;

subtracting an intensity pattern of the second digital object image and an intensity pattern of the second digital reference image from the second digital hologram image resulting in the digital holographic phase map of the object at the second wavelength.

5. The method of claim 4, wherein an angle between the reference beam and the object beam is greater than zero, thereby producing an off-axis hologram.

6. The method of claim 1, wherein the first wavelength and the second wavelength are within the visible range.

7. The method of claim 1, wherein the first wavelength and the second wavelength are within the infrared range.

8. The method of claim 1, wherein the first wavelength is longer than the second wavelength.

9. The method of claim 1, wherein the second wavelength is longer than the first wavelength.

10. The method of claim 1, wherein the step of referencing the digital holographic phase map at the first wavelength, thereby reproducing the image of the object further comprises, simulating a reference wave at a first wavelength incident upon the digital holographic phase map.

11. The method of claim 1, wherein the step of resolving the fringe number for each pixel phase value further comprises:

converting the result of the subtracting step into a plurality of distance values;

dividing each distance value by the second wavelength;

truncating the result of the dividing step;

multiplying the result of the truncating step by the second wavelength, resulting in the closest integer wavelength for each pixel value; and adding the distance value to the closest integer wavelength for each pixel value.

12. The method of claim 11, further comprising:

adding $\pi$ to the closest integer wavelength for each pixel value when the closest integer wavelength value is $\pi/2$ greater than the distance value; and subtracting $\pi$ from the closest integer wavelength for each pixel value when the closest integer wavelength value is $\pi/2$ less than the distance value.

13. A holographic phase-imaging method comprising the steps of:

recording a first hologram image at a first wavelength;

recording an first object image at a first wavelength;

recording a first reference image at a first wavelength;

generating a first phase map at a first wavelength from the recorded first hologram image, first object image and first reference image;

recording a second hologram image at a second wavelength, the second wavelength longer than the first wavelength;

recording a second object image at a second wavelength;

recording a second reference image at a second wavelength;

generating a second phase map at a second wavelength from the recorded second hologram image, second object image and second reference image;

subtracting the second phase map from the first phase map;

resolving the fringe number for each pixel phase value;

referencing the digital holographic phase map at the first wavelength; and calculating a topographical map of the object.

14. The method of claim 13, wherein the step of resolving the fringe number for each pixel phase value further comprises:

converting the result of the subtracting step into a plurality of distance values;

dividing each distance value by the second wavelength;

truncating the result of the dividing step;

multiplying the result of the truncating step by the second wavelength, resulting in the closest integer wavelength for each pixel value; and adding the distance value to the closest integer wavelength for each pixel value.

15. The method of claim 14, further comprising:

adding $\pi$ to the closest integer wavelength for each pixel value when the closest integer wavelength value is $\pi/2$ greater than the distance value; and subtracting $\pi$ from the closest integer wavelength for each pixel value when the closest integer wavelength value is $\pi/2$ less than the distance value.

16. A digital holographic phase-imaging system comprising:

a digital holographic imager to provide a first hologram image, a first object image and a first reference image at a first wavelength and a second hologram image, a second object image and a second reference image at a second wavelength;

a phase map generator to receive the first hologram image, the first object image, the first reference image, the second hologram image, the second object image and the second reference image and to generate a first phase map comprising a plurality of pixels at a first wavelength and a second phase map comprising a plurality of pixels at a second wavelength;

a contour generator to determine the fringe number of the plurality of pixels of the plurality of phase maps; and a resolution generator to produce sub-wavelength resolution of the object image.

17. The system of claim 16, wherein the digital holographic imager further comprises;

a first laser source to illuminate a reference mirror and a target object to generate the first hologram image, the first object image and the first reference image at the first wavelength;

a second laser source to illuminate a reference mirror and a target object to generate the second hologram image, the second object image and the second reference image at the second wavelength; and an image capture and storage device to transmit the first hologram image, the first object image, the first reference image, the second hologram image, the second reference image and the second object image to the phase map generator.

* * * * *

UNITED STATES PATENT AND TRADEMARK OFFICE
CERTIFICATE OF CORRECTION

| | | |
|---|---|---|
| PATENT NO. | : 6,809,845 B1 | Page 1 of 1 |
| APPLICATION NO. | : 10/668080 | |
| DATED | : October 26, 2004 | |
| INVENTOR(S) | : Myung K. Kim et al. | |

It is certified that error appears in the above-identified patent and that said Letters Patent is hereby corrected as shown below:

In the Specification,

Column 1, line 8, above the heading, "BACKGROUND OF INVENTION"

Please add the following Government Support Clause:

This invention was made with government support under Grant Number 9986257 awarded by the National Science Foundation. The government has certain rights in the invention.

Signed and Sealed this
Twenty-ninth Day of March, 2016

Michelle K. Lee
*Director of the United States Patent and Trademark Office*